United States Patent
Goodchild et al.

(10) Patent No.: US 12,046,922 B2
(45) Date of Patent: *Jul. 23, 2024

(54) ADAPTIVE FOREIGN OBJECT DETECTION AVOIDANCE IN A MULTI-COIL WIRELESS CHARGING DEVICE

(71) Applicant: AIRA, INC., Chandler, AZ (US)

(72) Inventors: Eric Heindel Goodchild, Phoenix, AZ (US); David Russell, Scottsdale, AZ (US)

(73) Assignee: Aira, Inc., Phoenix, AZ (US)

( * ) Notice: Subject to any disclaimer, the term of this patent is extended or adjusted under 35 U.S.C. 154(b) by 422 days.
This patent is subject to a terminal disclaimer.

(21) Appl. No.: 17/400,045

(22) Filed: Aug. 11, 2021

(65) Prior Publication Data
US 2022/0052561 A1 Feb. 17, 2022

Related U.S. Application Data

(60) Provisional application No. 63/066,310, filed on Aug. 16, 2020.

(51) Int. Cl.
*H02J 7/00* (2006.01)
*H02J 50/12* (2016.01)
*H02J 50/60* (2016.01)

(52) U.S. Cl.
CPC .............. *H02J 50/60* (2016.02); *H02J 50/12* (2016.02)

(58) Field of Classification Search
CPC ....................................................... H02J 50/60
USPC ......................................................... 320/108
See application file for complete search history.

(56) References Cited

U.S. PATENT DOCUMENTS

| 11,605,987 | B2* | 3/2023 | Goodchild | H02J 50/402 |
| 2014/0232199 | A1 | 8/2014 | Jung et al. | |
| 2014/0368167 | A1* | 12/2014 | Okura | H02M 3/33507 363/21.01 |
| 2016/0190855 | A1* | 6/2016 | Katabi | H02J 50/12 320/108 |
| 2016/0276875 | A1 | 9/2016 | Verghese et al. | |

(Continued)

OTHER PUBLICATIONS

PCT/US2021/045810. International Search Report and Written Opinion mailed Nov. 4, 2021. (8 pages).

(Continued)

*Primary Examiner* — Yalkew Fantu
(74) *Attorney, Agent, or Firm* — Anthony G. Smyth; LOZA & LOZA, LLP

(57) ABSTRACT

Systems, methods and apparatus for wireless charging are disclosed. A charging device has a plurality of charging cells provided on a charging surface, a charging circuit and a controller. The controller may be configured detect the presence of a foreign object in proximity to at least one charging coil of a plurality of charging coils in the charging device that is selected for supplying charging energy to a receiving device. Additionally, the controller may be configured to determine whether one or more other charging coils is capable of supplying charging energy to the receiving device, and determine, for each of the one or more other charging coils, whether the foreign object is in proximity thereto. Further, the controller may be configured to select at least one of the one or more other charging coils not in proximity to the foreign object for supplying charging energy to the receiving device.

14 Claims, 17 Drawing Sheets

(56) References Cited

U.S. PATENT DOCUMENTS

| | | |
|---|---|---|
| 2019/0207436 A1 | 7/2019 | Yoon et al. |
| 2019/0267828 A1 | 8/2019 | Goodchild et al. |
| 2020/0136436 A1* | 4/2020 | Goodchild .............. H02J 50/12 |
| 2021/0028657 A1* | 1/2021 | Goodchild .............. H02J 50/12 |
| 2021/0152037 A1* | 5/2021 | Goodchild .............. H02J 50/12 |

OTHER PUBLICATIONS

Xia et al. Foreign Object Detection for Electric Vehicle Wireless Charging. Electronics MDPI, May 14, 2020. [retrieved on Nov. 16, 2021]. Retrieved from the Internet. <URL: https:/lwww .mdpi.com/2079-9292/9/5/805/pdf>. entire document.

* cited by examiner

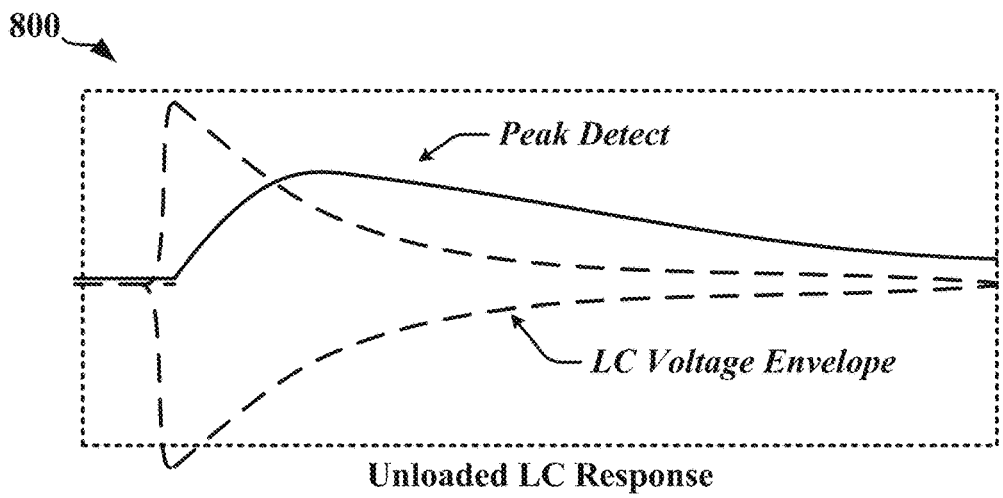
Unloaded LC Response
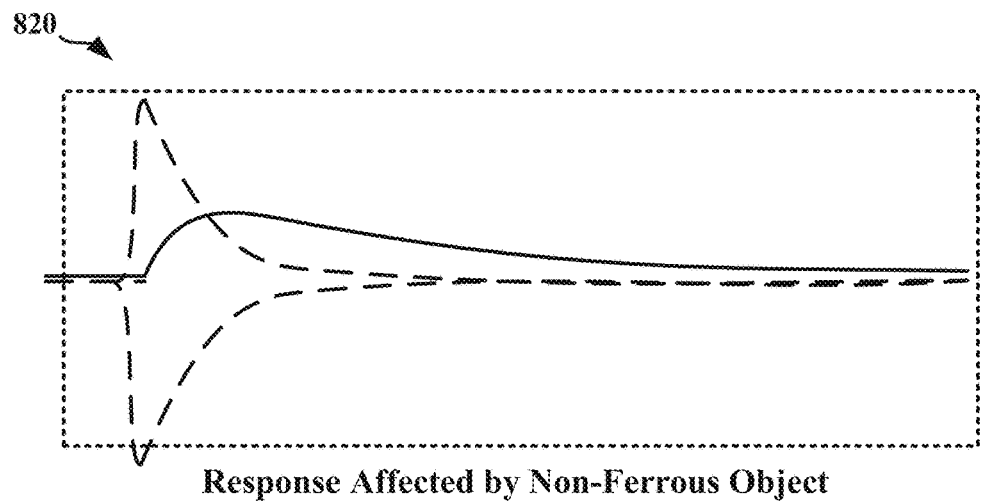
Response Affected by Non-Ferrous Object
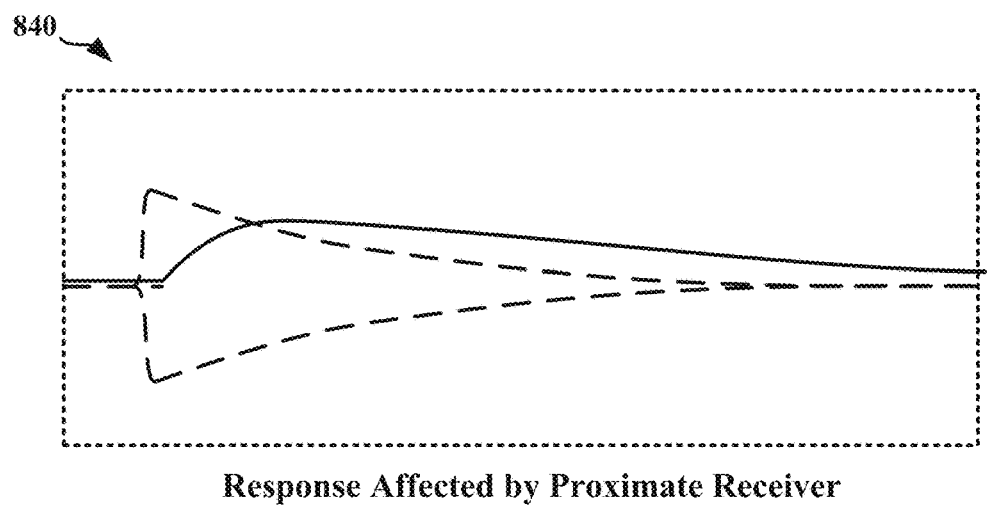
Response Affected by Proximate Receiver
*FIG. 8*

ADAPTIVE FOREIGN OBJECT DETECTION AVOIDANCE IN A MULTI-COIL WIRELESS CHARGING DEVICE

PRIORITY CLAIM

This application claims priority to and the benefit of provisional patent application No. 63/066,310 filed in the United States Patent Office on Aug. 16, 2020, and the entire content of this application is incorporated herein by reference as if fully set forth below in their entirety and for all applicable purposes.

TECHNICAL FIELD

The present invention relates generally to wireless charging of batteries, including batteries in mobile computing devices, and more particularly to adaptive foreign object detection avoidance in a wireless charging device having multiple charging coils.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Wireless charging systems may include the ability to detect foreign objects (i.e., objects not capable of being charged or receiving charging energy) placed on a charging surface of the wireless charging system. This foreign object detection (FOD) allows the charging system to limit or shut down energy supplied by charging coils in a multi-coil charging system that are in proximity to the foreign object in order to avoid unnecessary power loss, system noise, and even unwanted heated of the foreign objects. Typically, when a FOD condition is triggered, the charging coils in proximity to the foreign object are placed into a permanent FOD state where the charging coils are limited or shut down.

Improvements in wireless charging capabilities are required to support continually increasing complexity of mobile devices and changing form factors. For example, there is a need for during a wireless charging operation.

BRIEF DESCRIPTION OF THE DRAWINGS

FIG. 8 illustrates examples of observed differences in responses to a passive ping in accordance with certain aspects disclosed herein.

DETAILED DESCRIPTION

Figure 1:
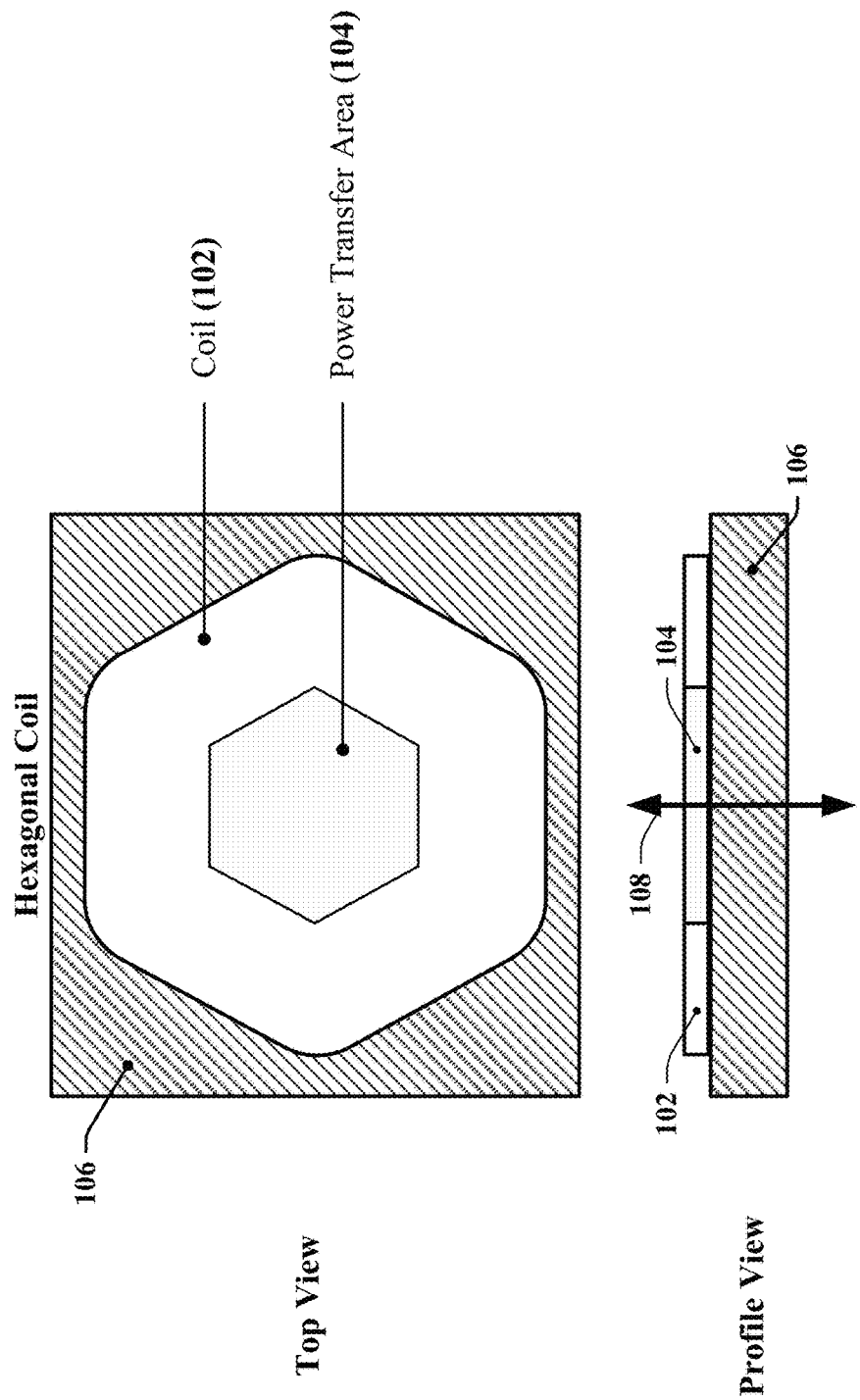
FIG. 1 illustrates an example of a charging cell that may be provided on a charging surface provided by a wireless charging device in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging surface in a charging device where the charging surface enables the charging device to charge one or more chargeable devices wirelessly. The location of a device to be charged may be detected through sensing techniques that associate location of the device to changes in a physical characteristic centered at a known location on the charging surface. Sensing of location may be implemented using capacitive, resistive, inductive, touch, pressure, load, strain, and/or another appropriate type of sensing.

In one aspect of the disclosure, an apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to the charging surface of the charging device without overlap of power transfer areas of the charging cells in the plurality of charging cells.

In some instances, the apparatus may also be referred to as a charging surface. Power can be wirelessly transferred to a receiving device located anywhere on a surface of the apparatus. The devices can have an arbitrarily defined size and/or shape and may be placed without regard to any discrete placement locations enabled for charging. Multiple devices can be simultaneously charged on a single charging surface. The apparatus can track motion of one or more devices across the charging surface.

Charging Cells

According to certain aspects disclosed herein, a charging surface may be provided using charging cells in a charging device, where the charging cells are deployed adjacent to the charging surface. In one example the charging cells are deployed in one or more layers of the charging surface in accordance with a honeycomb packaging configuration. A charging cell may be implemented using one or more coils that can each induce a magnetic field along an axis that is substantially orthogonal to the charging surface adjacent to the coil. In this description, a charging cell may refer to an element having one or more coils where each coil is configured to produce an electromagnetic field that is additive with respect to the fields produced by other coils in the charging cell and directed along or proximate to a common axis. In some examples, the coils in a charging cell are formed using traces on a printed circuit board. In some examples, a coil in a charging cell is formed by spirally winding a wire to obtain a planar coil or a coil that has a generally cylindrical outline. In one example, Litz wire may be used to form a planar or substantially flat winding that provides a coil with a central power transfer area.

In some implementations, a charging cell includes coils that are stacked along a common axis and/or that overlap such that they contribute to an induced magnetic field substantially orthogonal to the charging surface. In some implementations, a charging cell includes coils that are arranged within a defined portion of the charging surface and that contribute to an induced magnetic field within the substantially orthogonal portion of the charging surface associated with the charging cell. In some implementations, charging cells may be configurable by providing an activating current to coils that are included in a dynamically-defined charging cell. For example, a charging device may include multiple stacks of coils deployed across the charging surface, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface of a charging device. As described herein, the charging surface may include an array of charging cells 100 provided on one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that encloses one or more coils 102, which may be constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
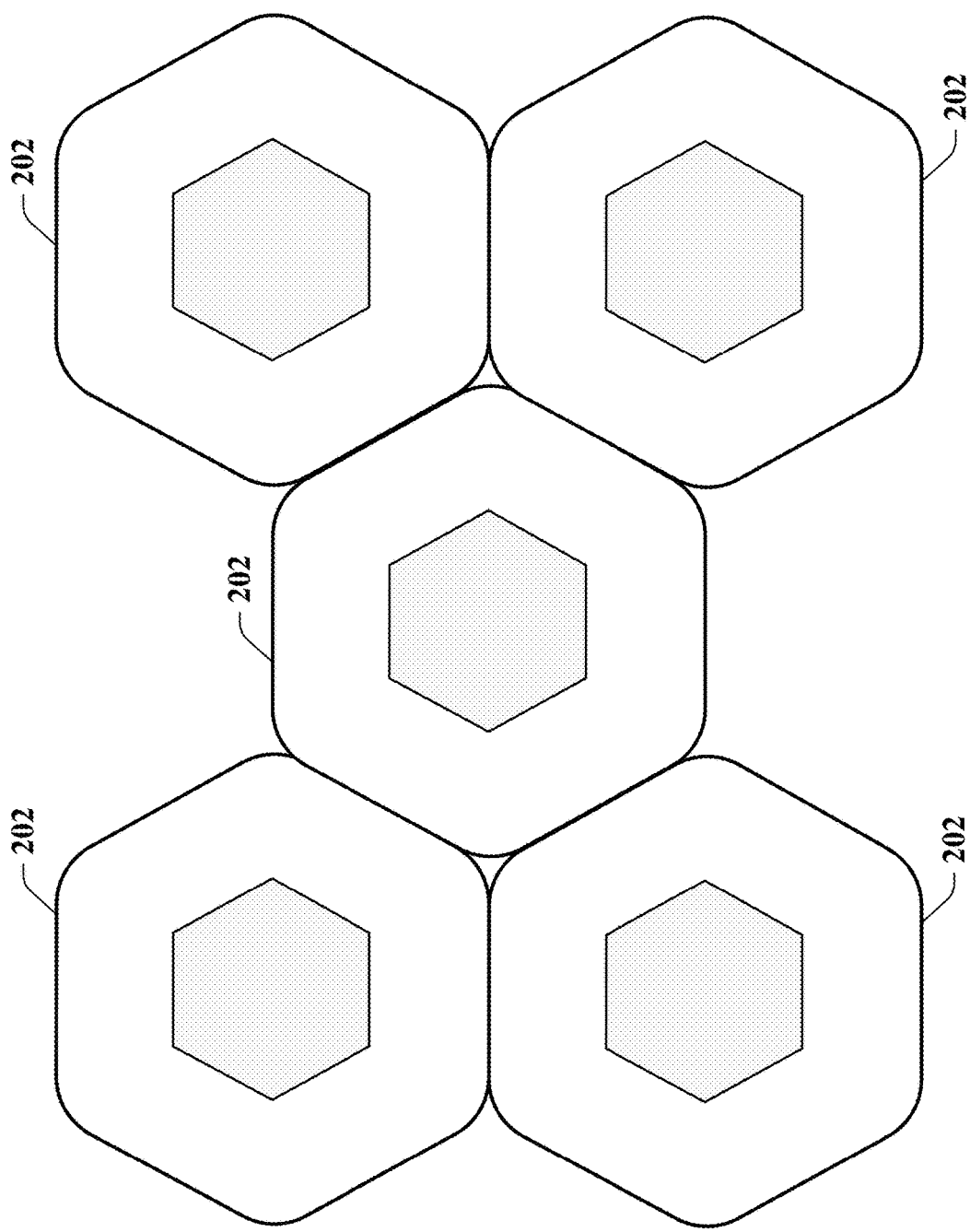
FIG. 2 illustrates an example of an arrangement of charging cells provided on a single layer of a segment of a charging surface provided by a wireless charging device in accordance with certain aspects disclosed herein.

FIG. 2 illustrates an example of an arrangement 200 of charging cells 202 provided on a single layer of a segment of a charging surface of a charging device that may be adapted in accordance with certain aspects disclosed herein. The charging cells 202 are arranged according to a honeycomb packaging configuration. In this example, the charging cells 202 are arranged end-to-end without overlap. This arrangement can be provided without through-hole or wire interconnects. Other arrangements are possible, including arrangements in which some portion of the charging cells 202 overlap. For example, wires of two or more coils may be interleaved to some extent.

Figure 3:
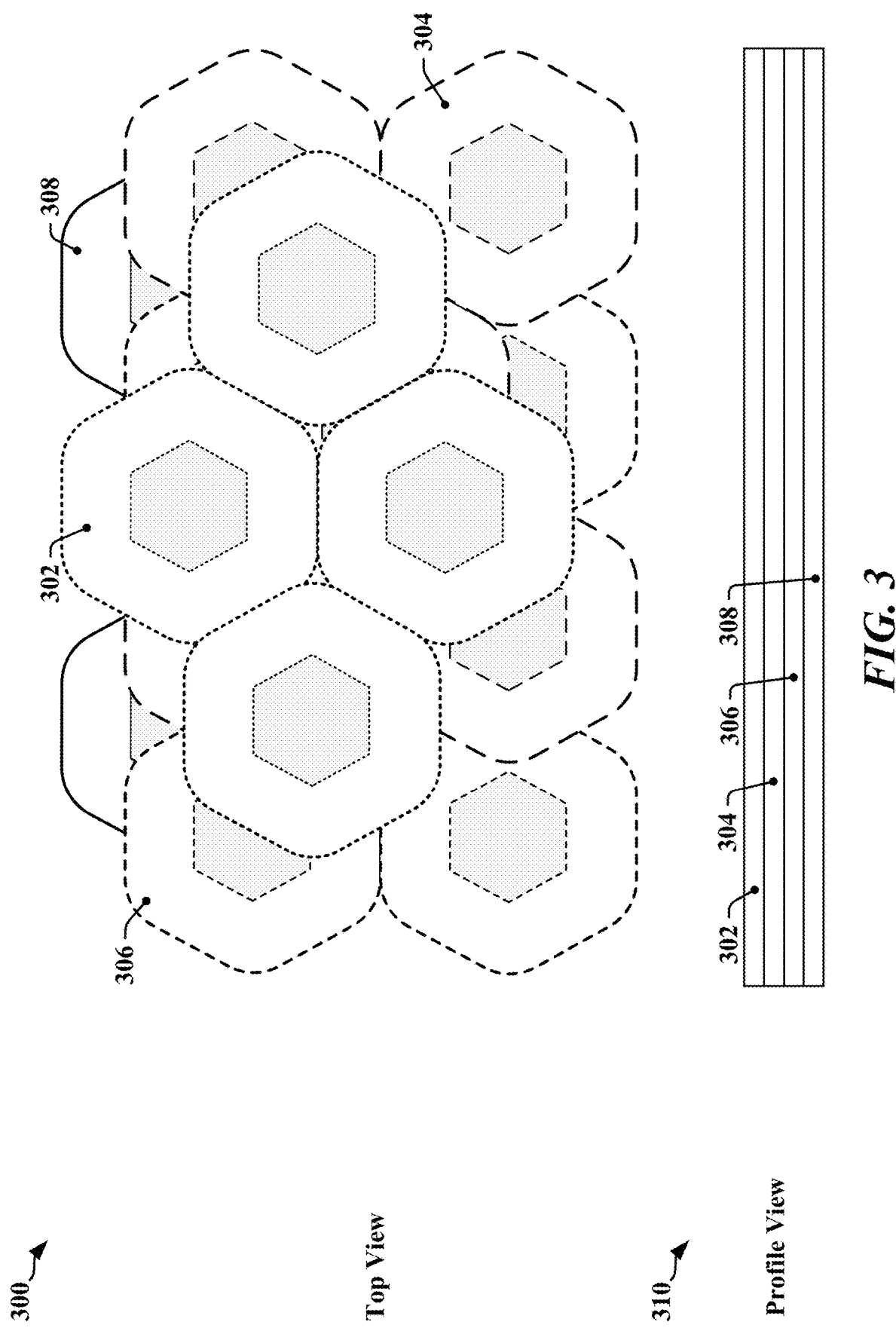
FIG. 3 illustrates an example of an arrangement of charging cells when multiple layers of charging cells are overlaid within a segment of a charging surface provided by a wireless charging device in accordance with certain aspects disclosed herein.

FIG. 3 illustrates an example of an arrangement of charging cells from two perspectives 300, 310 when multiple layers are overlaid within a segment of a charging surface that may be adapted in accordance with certain aspects disclosed herein. Layers of charging cells 302, 304, 306, 308 are provided within a segment of a charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment. The charging cells may be 302, 304, 306, 308 illustrated in FIG. 3 correspond to power transfer areas provided by transmitting coils that are polygonal in shape. In other implementations, the charging coils may comprise spirally-wound planar coils constructed from wires, each being wound to provide a substantially circular power transfer area. In the latter examples, multiple spirally-wound planar coils may be deployed in stacked planes below the charging surface of a wireless charging device.

Figure 4:
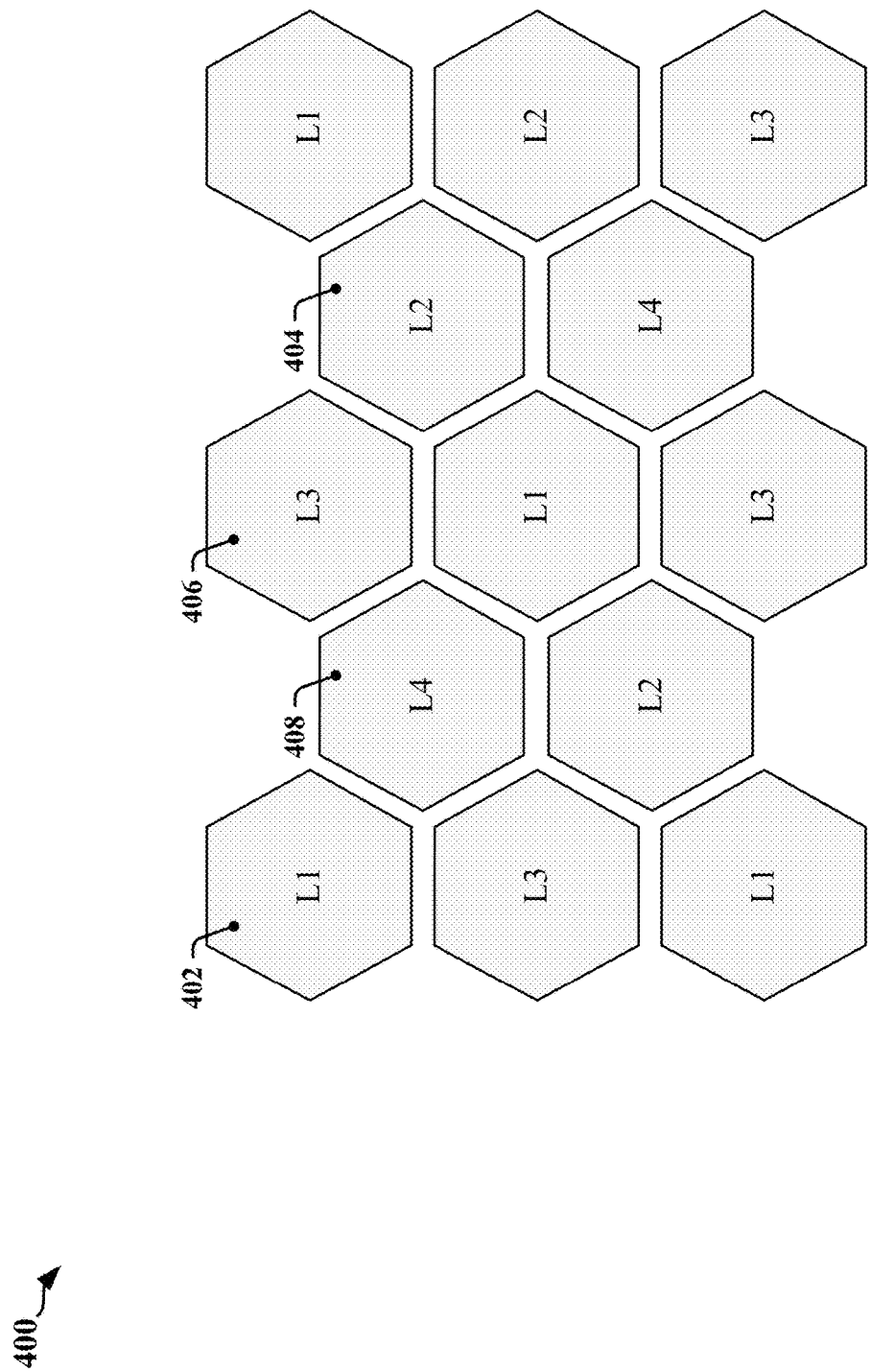
FIG. 4 illustrates the arrangement of power transfer areas provided by a charging surface of a charging device that employs multiple layers of charging cells configured in accordance with certain aspects disclosed herein.

FIG. 4 illustrates the arrangement of power transfer areas provided across a surface 400 of a charging device that employs multiple layers of charging cells configured in accordance with certain aspects disclosed herein. The illustrated charging surface is constructed from four layers of charging cells 402, 404, 406, 408, which may correspond to the layers of charging cells 302, 304, 306, 308 in FIG. 3. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
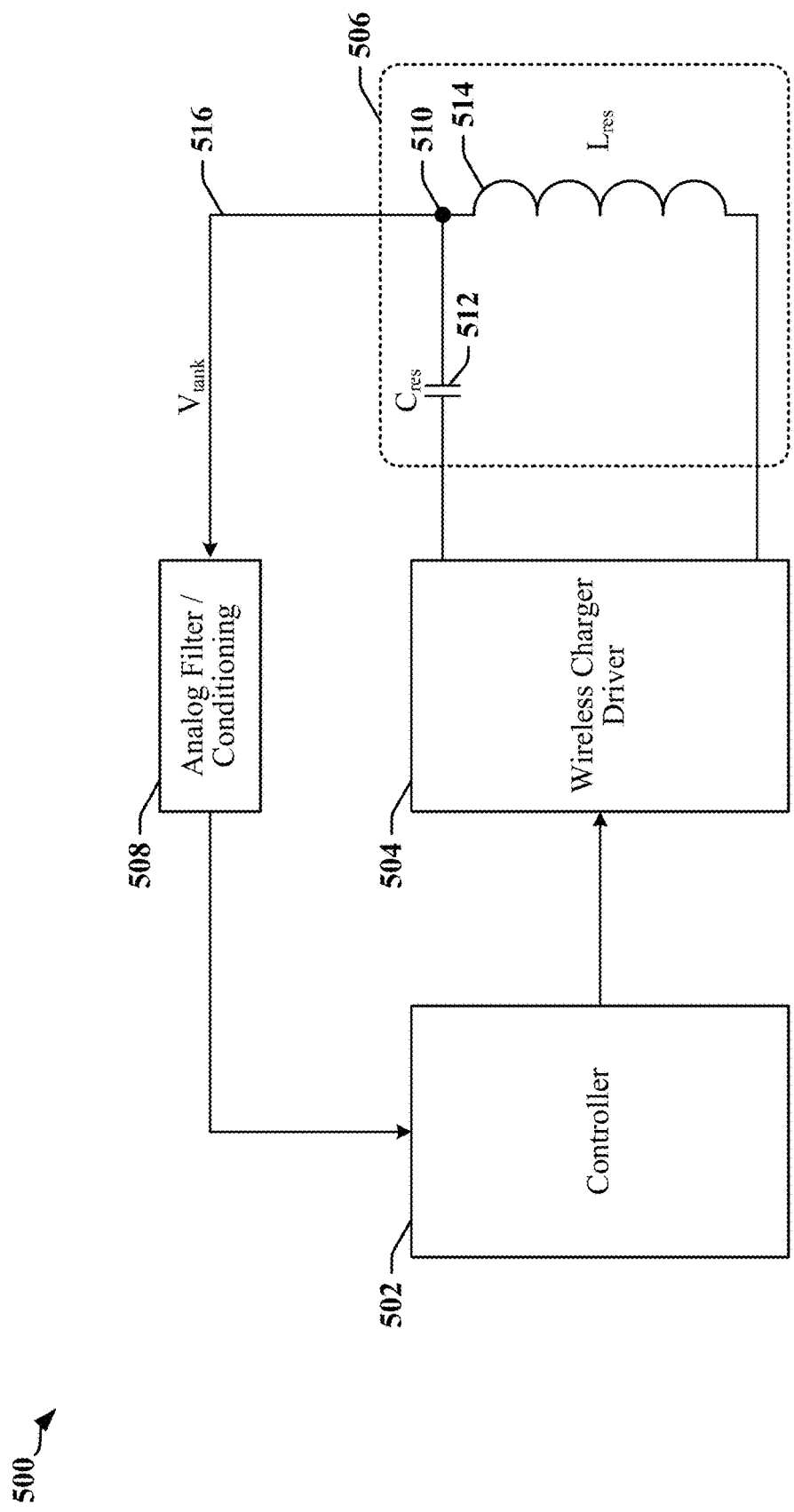
FIG. 5 illustrates a wireless transmitter that may be provided in a charger base station in accordance with certain aspects disclosed herein.

FIG. 5 illustrates a wireless transmitter 500 that may be provided in a charger base station or wireless charging system. A controller 502 may receive a feedback signal that is filtered or otherwise processed by a conditioning circuit 508. The controller may control the operation of a driver circuit 504 that provides an alternating current to a resonant circuit 506 that includes a capacitor 512 and inductor 514. The resonant circuit 506 may also be referred to herein as a tank circuit, LC tank circuit, or LC tank, and the voltage 516 measured at an LC node 510 of the resonant circuit 506 may be referred to as the tank voltage.

The wireless transmitter 500 may be used by a charging device to determine if a compatible device has been placed on a charging surface. For example, the charging device may determine that a compatible device has been placed on the charging surface by sending an intermittent test signal (active ping or digital ping) through the wireless transmitter 500, where the resonant circuit 506 may detect or receive encoded signals when a compatible device responds to the test signal or modifies a characteristic of the test signal. The charging device may be configured to activate one or more coils in at least one charging cell after receiving a response signal defined by standards, convention, manufacturer or application. In some examples, the compatible device can respond to a ping by communicating received signal strength such that the charging device can find an optimal charging cell to be used for charging the compatible device.

Passive Ping

According to certain aspects disclosed herein, coils in one or more charging cells may be selectively activated to provide an optimal electromagnetic field for charging a compatible device. In some instances, coils may be assigned to charging cells, and some charging cells may overlap other charging cells. In the latter instances, the optimal charging configuration may be selected at the charging cell level. In other instances, charging cells may be defined based on placement of a device to be charged on a surface of the charging device. In these other instances, the combination of coils activated for each charging event can vary. In some implementations, a charging device may include a driver circuit that can select one or more cells and/or one or more predefined charging cells for activation during a charging event.

Wireless charging devices may be adapted in accordance with certain aspects disclosed herein to support a low-power discovery technique that can replace and/or supplement conventional ping transmissions. A conventional ping is produced by driving a resonant LC circuit that includes a transmitting coil of a base station. The base station then waits for an ASK-modulated response from the receiving device. A low-power discovery technique may include utilizing a passive ping to provide fast and/or low-power discovery. According to certain aspects, a passive ping may be produced by driving a network that includes the resonant LC circuit with a fast pulse that includes a small amount of energy. The fast pulse excites the resonant LC circuit and causes the network to oscillate at its natural resonant frequency until the injected energy decays and is dissipated. In one example, the fast pulse may have a duration corresponding to a half cycle of the resonant frequency of the network and/or the resonant LC circuit. When the base station is configured for wireless transmission of power within the frequency range 100 kHz to 200 kHz, the fast pulse may have a duration that is less than 2.5 µs.

The passive ping may be characterized and/or configured based on the natural frequency at which the network including the resonant LC circuit rings, and the rate of decay of energy in the network. The ringing frequency of the network and/or resonant LC circuit may be defined as:

$$\omega = \frac{1}{\sqrt{LC}} \quad \text{(Eq. 1)}$$

The rate of decay is controlled by the quality factor (Q factor) of the oscillator network, as defined by:

$$Q = \frac{1}{R}\sqrt{\frac{L}{C}} \quad \text{(Eq. 2)}$$

Equations 1 and 2 show that resonant frequency is affected by L and C, while the Q factor is affected by L, C and R. In a base station provided in accordance with certain aspects disclosed herein, the wireless driver has a fixed value of C determined by the selection of the resonant capacitor. The values of L and R are determined by the wireless transmitting coil and by an object or device placed adjacent to the wireless transmitting coil.

The wireless transmitting coil is configured to be magnetically coupled with a receiving coil in a device placed within close proximity of the transmitting coil, and to couple some of its energy into the proximate device to be charged. The L and R values of the transmitter circuit can be affected by the characteristics of the device to be charged, and/or other objects within close proximity of the transmitting coil. As an example, if a piece of ferrous material with a high magnetic permeability placed near the transmitter coils can increase the total inductance (L) of the transmitter coil, resulting in a lower resonant frequency, as shown by Equation 1. Some energy may be lost through heating of materials due to eddy current induction, and these losses may be characterized as an increase the value of R thereby lowering the Q factor, as shown by Equation 2.

A wireless receiver placed in close proximity to the transmitter coil can also affect the Q factor and resonant frequency. The receiver may include a tuned LC network with a high Q, which can result in the transmitter coil having a lower Q factor. The resonant frequency of the transmitter coil may be reduced due to the addition of the magnetic material in the receiver, which is now part of the total magnetic system. Table 1 illustrates certain effects attributable to different types of objects placed within close proximity to the transmitter coil.

TABLE 1

| Object | L | R | Q | Frequency |
|---|---|---|---|---|
| None present | Base Value | Base value | Base Value (High) | Base Value |
| Ferrous | Small Increase | Large Increase | Large Decrease | Small Decrease |
| Non-ferrous | Small Decrease | Large Increase | Large Decrease | Small Increase |
| Wireless Receiver | Large Increase | Small Decrease | Small Decrease | Large Decrease |

Passive ping techniques may use the voltage and/or current measured or observed at the LC node 510 to identify the presence of a receiving coil in proximity to the charging pad of a device adapted in accordance with certain aspects disclosed herein. In many conventional wireless charger transmitters, circuits are provided to measure voltage at the LC node 510 or the current in the network. These voltages and currents may be monitored for power regulation purposes and/or to support communication between devices. In the example illustrated in FIG. 5, voltage at the LC node 510 is monitored, although it is contemplated that current may additionally or alternatively be monitored to support passive ping. A response of the resonant circuit 506 to a passive ping (initial voltage $V_0$) may be represented by the voltage ($V_{LC}$) at the LC node 510, such that:

$$V_{LC} = V_0 e^{-\left(\frac{\omega}{2Q}\right)t} \quad \text{(Eq. 3)}$$

Figure 6:
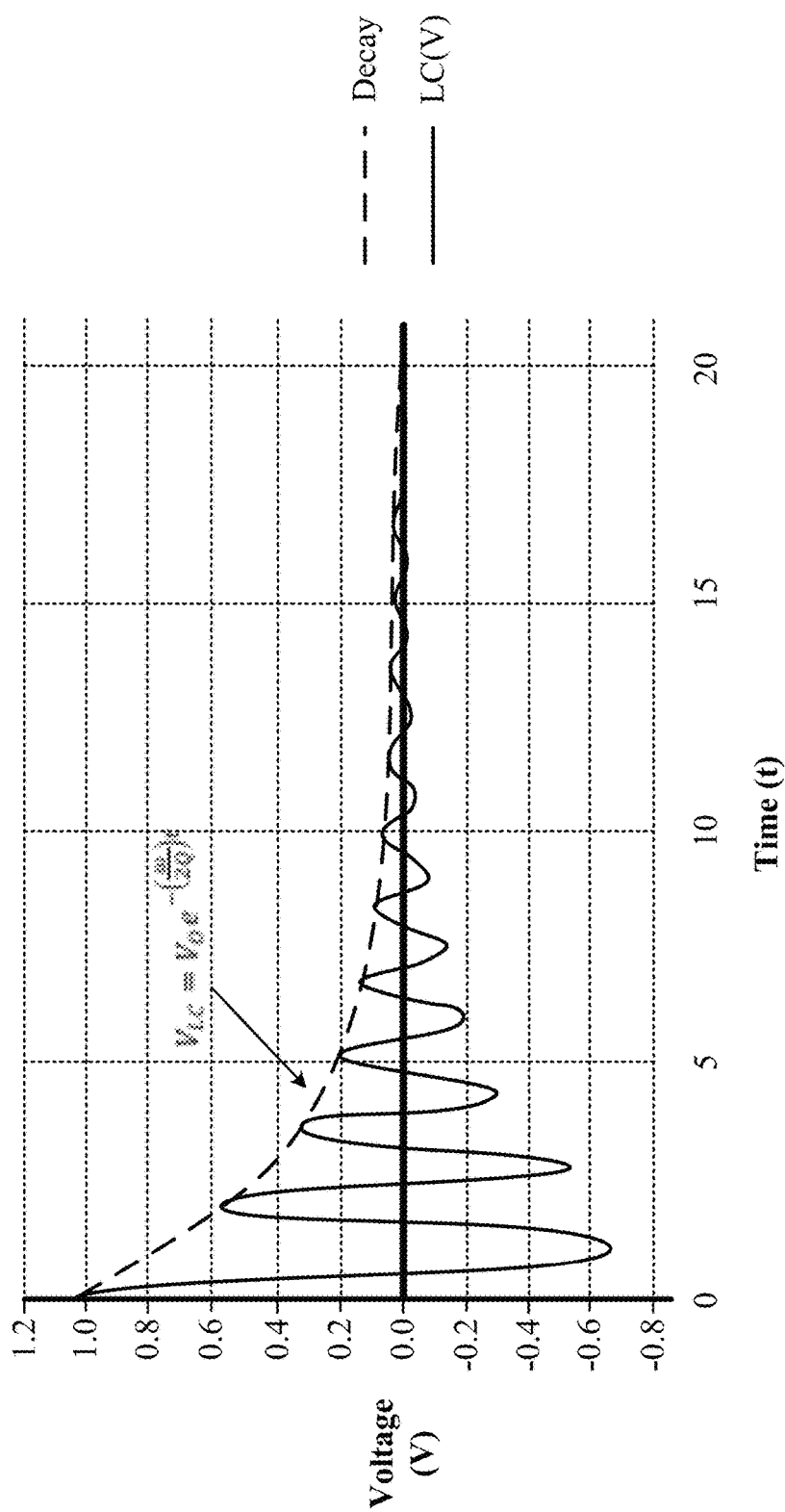
FIG. 6 illustrates a first example of a response to a passive ping in accordance with certain aspects disclosed herein.

FIG. 6 illustrates a first example in which a response 600 to a passive ping decays according to Equation 3. After the excitation pulse at time t=0, the voltage and/or current is seen to oscillate at the resonant frequency defined by Equation 1, and with a decay rate defined by Equation 3. The first cycle of oscillation begins at voltage level $V_0$ and $V_{LC}$ continues to decay to zero as controlled by the Q factor and ω. The example illustrated in FIG. 6 represents a typical open or unloaded response when no object is located on or proximate to the charging pad. In FIG. 6 the value of the Q factor is assumed to be 20.

Figure 7:
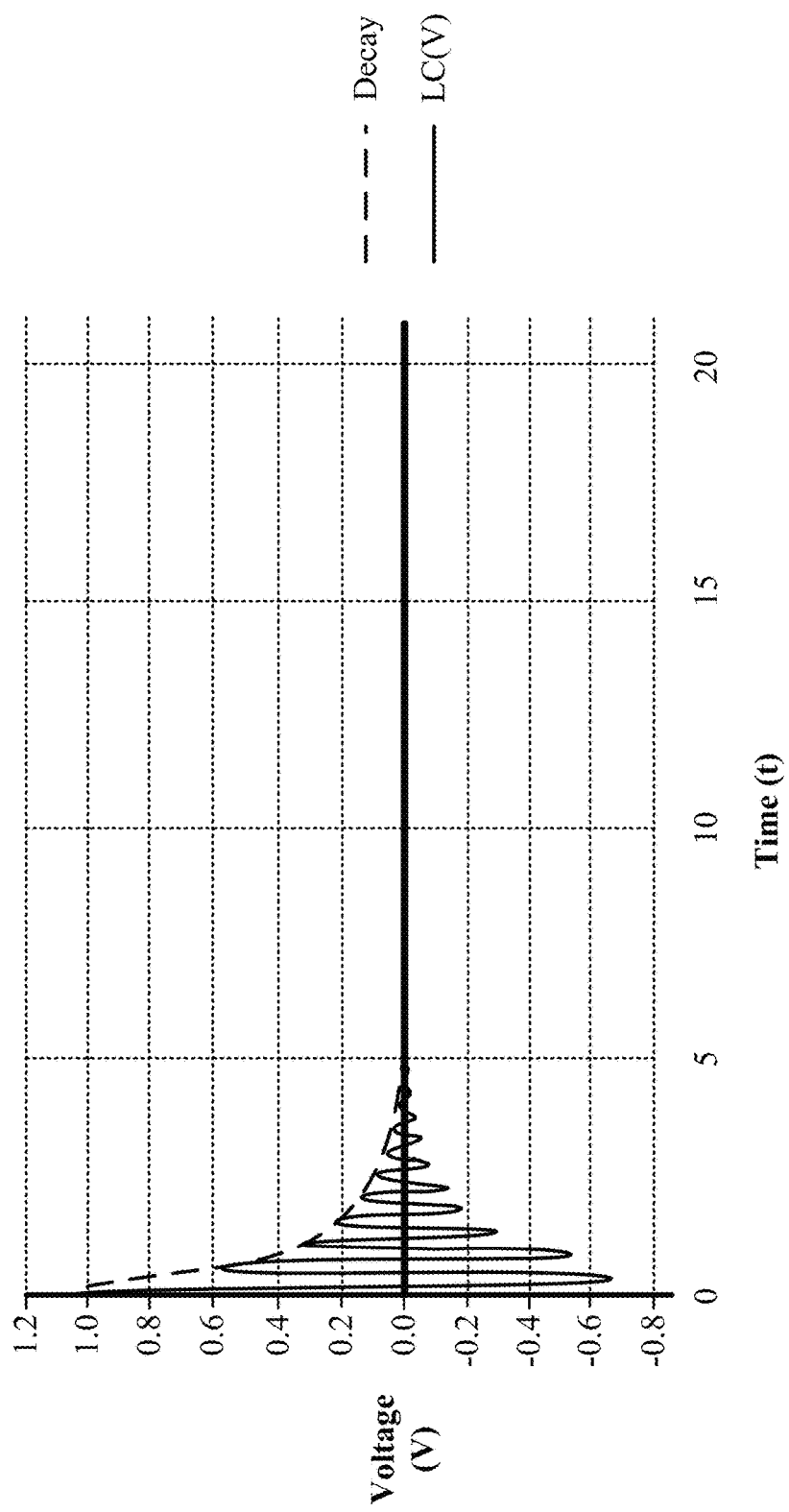
FIG. 7 illustrates a second example of a response to a passive ping in accordance with certain aspects disclosed herein.

FIG. 7 illustrates a second example in which a response 700 to a passive ping decays according to Equation 3. After the excitation pulse at time=0, the voltage and/or current is seen to oscillate at the resonant frequency defined by Equation 1, and with a decay rate defined by Equation 3. The first cycle of oscillation begins at voltage level $V_0$ and $V_{LC}$ continues to decay to zero as controlled by the Q factor and ω. The example illustrated in FIG. 7 represents a loaded response when an object is present or proximate to the charging pad loads the coil. In FIG. 6 the Q factor may have a value of 7. $V_{LC}$ oscillates at a higher frequency in the voltage response 700 with respect to the voltage response 600.

FIG. 8 illustrates a set of examples in which differences between responses 800, 820, 840 may be observed. A passive ping is initiated when a driver circuit 504 excites the resonant circuit 506 using a pulse that is shorter than 2.5 µs. Different types of wireless receivers and foreign objects placed on the transmitter result in different responses observable in the voltage at the LC node 510 or current in the resonant circuit 506 of the transmitter. The differences may indicate variations in the Q factor of the resonant circuit 506 frequency of the oscillation of $V_0$. Table 2 illustrates certain examples of objects placed on the charging pad in relation to an open state.

TABLE 2

| Object | Frequency | $V_{peak}$ (mV) | 50% Decay Cycles | Q Factor |
| --- | --- | --- | --- | --- |
| None present | 96.98 kHz | 134 mV | 4.5 | 20.385 |
| Type-1 Receiver | 64.39 kHz | 82 mV | 3.5 | 15.855 |
| Type-2 Receiver | 78.14 kHz | 78 mV | 3.5 | 15.855 |
| Type-3 Receiver | 76.38 kHz | 122 mV | 3.2 | 14.496 |
| Misaligned Type-3 Receiver | 210.40 kHz | 110 mV | 2.0 | 9.060 |
| Ferrous object | 93.80 kHz | 110 mV | 2.0 | 9.060 |
| Non-ferrous object | 100.30 kHz | 102 mV | 1.5 | 6.795 |

In Table 2, the Q factor may be calculated as follows:

$$Q = \frac{\pi N}{\ln(2)} \cong 4.53N, \quad \text{(Eq. 3)}$$

where N is the number of cycles from excitation until amplitude falls below 0.5 $V_0$.

Figure 9:
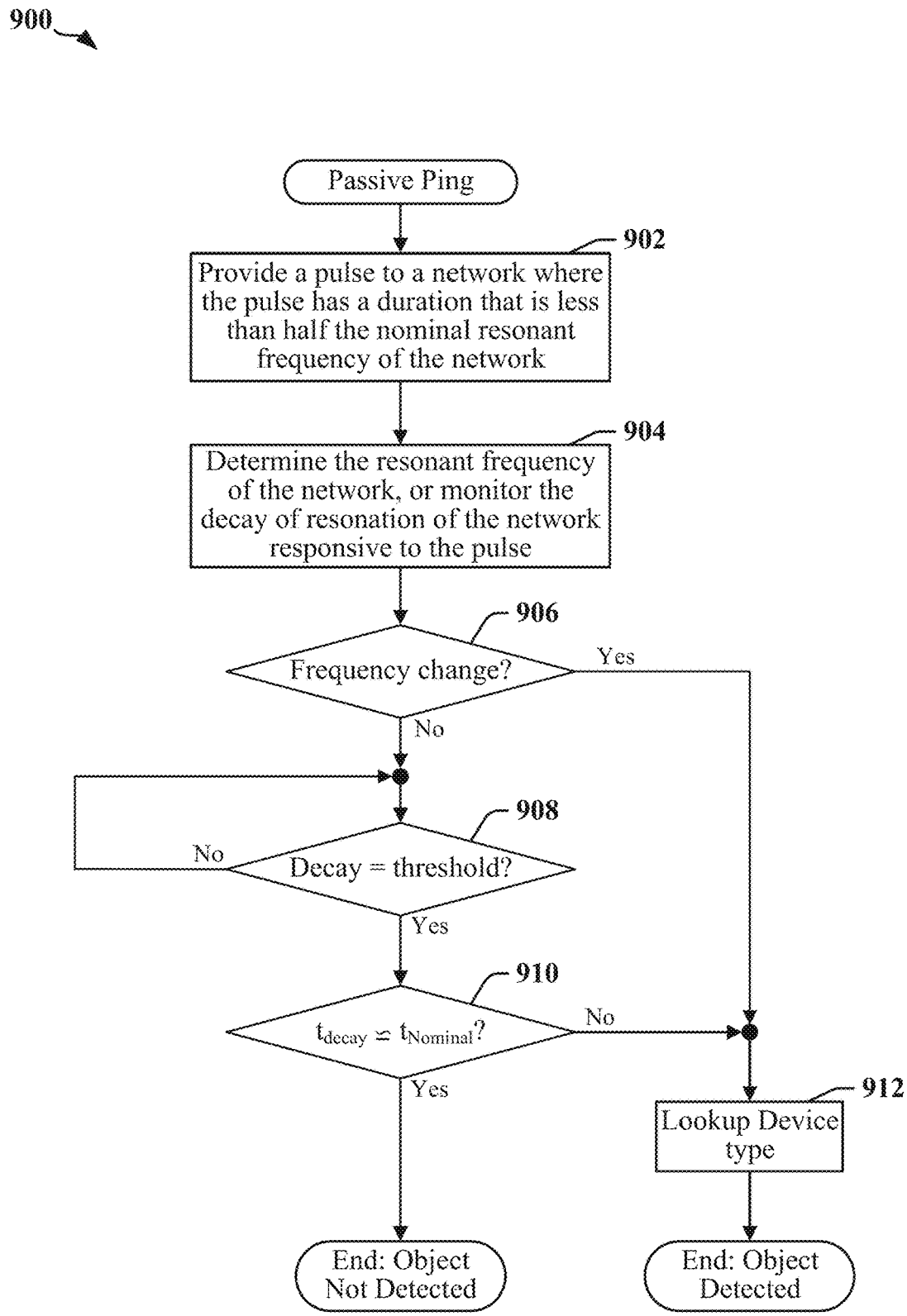
FIG. 9 is a flowchart that illustrates a method involving passive ping implemented in a wireless charging device adapted in accordance with certain aspects disclosed herein.

FIG. 9 is a flowchart 900 that illustrates a method involving passive ping implemented in a wireless charging device adapted in accordance with certain aspects disclosed herein. At block 902, a controller may generate a short excitation pulse and may provide the short excitation pulse to a network that includes a resonant circuit. The network may have a nominal resonant frequency and the short excitation pulse may have a duration that is less than half the nominal resonant frequency of the network. The nominal resonant frequency may be observed when the transmitting coil of the resonant circuit is isolated from external objects, including ferrous objects, non-ferrous objects and/or receiving coils in a device to be charged. In some examples, the short excitation pulse has a duration corresponding to one or more cycles of the nominal resonant frequency of the network. In some examples, the short excitation pulse has a duration corresponding to at least five cycles of the nominal resonant frequency of the network.

At block 904, the controller may determine the resonant frequency of the network or may monitor the decay of resonation of the network responsive to the pulse. According to certain aspects disclosed herein, the resonant frequency and/or the Q factor associated with the network may be altered when a device or other object is placed in proximity to the transmitting coil. The resonant frequency may be increased or decreased from the nominal resonant frequency observed when the transmitting coil of the resonant circuit is isolated from external objects. The Q factor of the network may be increased or decreased with respect to a nominal Q factor measurable when the transmitting coil of the resonant circuit is isolated from external objects. According to certain aspects disclosed herein, the duration of delay can be indicative of the presence or type of an object placed in proximity to the transmitting coil when differences in Q factor prolong or accelerate decay of amplitude of oscillation in the resonant circuit with respect to delays associated with a nominal Q factor.

In one example, the controller may determine the resonant frequency of the network using a transition detector circuit configured to detect zero crossings of a signal representative of the voltage at the LC node 510 using a comparator or the like. In some instances, direct current (DC) components may be filtered from the signal to provide a zero crossing. In some instances, the comparator may account for a DC component using an offset to detect crossings of a common voltage level. A counter may be employed to count the detected zero crossings. In another example the controller may determine the resonant frequency of the network using a transition detector circuit configured to detect crossings through a threshold voltage by a signal representative of the voltage at the LC node 510, where the amplitude of the signal is clamped or limited within a range of voltages that can be detected and monitored by logic circuits. In this example, a counter may be employed to count transitions in the signal. The resonant frequency of the network may be measured, estimated, and/or calculated using other methodologies.

In another example, a timer or counter may be employed to determine the time elapsed for $V_{LC}$ to decay from voltage level $V_O$ to a threshold voltage level. The elapsed time may be used to represent a decay characteristic of the network. The threshold voltage level may be selected to provide sufficient granularity to enable a counter or timer to distinguish between various responses 800, 820, and 840 to the pulse. $V_{LC}$ may be represented by detected or measured peak, peak-to-peak, envelope and/or rectified voltage level. The decay characteristic of the network may be measured, estimated, and/or calculated using other methodologies.

If at block 906, the controller determines that a change in resonant frequency with respect to a nominal resonant frequency indicate presence of an object in proximity to the transmitting coil, the controller may attempt to identify the object at block 912. If the controller determines at block 906 that resonant frequency is substantially the same as the nominal resonant frequency, the controller may consider the decay characteristic of the amplitude of oscillation in the resonant circuit at block 908. The controller may determine that the resonant frequency of the network is substantially the same as the nominal resonant frequency when the frequency remains within a defined frequency range centered on, or including the nominal resonant frequency. In some implementations, the controller may identify objects using changes in resonant frequency and decay characteristics. In these latter implementations, the controller may continue at block 908 regardless of resonant frequency, and may use a change in resonant frequency as an additional parameter when identifying an object positioned proximately the transmission coil.

At block 908, the controller may use a timer and/or may count the cycles of the oscillation in the resonant circuit that have elapsed between the initial $V_O$ amplitude and a threshold amplitude used to assess the decay characteristic. In one example, $V_O/2$ may be selected as the threshold amplitude. At block 910, the number of cycles or the elapsed time between the initial $V_O$ amplitude and the threshold amplitude may be used to characterize decay in the amplitude of oscillation in the resonant circuit, and to compare the characterize decay with a corresponding nominal decay characteristic. If at block 910, no change in frequency and delay characteristic is detected, the controller may terminate the procedure with a determination that no object is proximately located to the transmission coil. If at block 910, a change in frequency and/or delay characteristic has been detected, the controller may identify the object at block 912.

At block 912, the controller may be configured to identify receiving devices placed on a charging pad. The controller may be configured to ignore other types of objects, or receiving devices that are not optimally placed on the charging pad including, for example, receiving devices that are misaligned with the transmission coil that provides the passive ping. In some implementations, the controller may use a lookup table indexed by resonant frequency, decay time, change in resonant frequency, change in decay time and/or Q factor estimates. The lookup table may provide information identifying specific device types, and/or charging parameters to be used when charging the identified device or type of device.

In some examples, passive ping uses a very short excitation pulse that can be less than a half-cycle of the nominal resonant frequency observed at the LC node 910 in the resonant circuit 906. A conventional ping may actively drive a transmission coil for more than 16,000 cycles. The power and time consumed by a conventional ping can exceed the power and time use of a passive ping by several orders of magnitude. In one example, a passive ping consumes approximately 0.25 μJ per ping with a max ping time of around ~100 μs, while a conventional active ping consumes approximately 80 mJ per ping with a max ping time of around 90 ms. In this example, energy dissipation may be reduced by a factor of 320,000 and the time per ping may be reduced by a factor of 900.

Passive ping may also be used with another, reduced-power sensing methodology, such as capacitive sensing. Capacitive sensing or the like can provide an ultra-low power detection method that determines presence or non-presence of an object is in proximity to the charging surface. After capacitive sense detection, a passive ping can be transmitted sequentially or concurrently on each coil to produce a more accurate map of where a potential receiving device and/or object is located. After a passive ping procedure has been conducted, an active or digital ping may be provided in the most likely device locations.

Foreign Object Detection

According to some aspects, foreign object detection (FOD) may be used to detect foreign objects (FOs) that may be disposed on a charging surface of wireless charging device or base. A device or other object that is not able to receive wirelessly transmitted power from the wireless charging device or base may be considered a foreign object. Foreign objects may be detected by a passive ping transmitted through one or more idle charging cells in the vicinity of the foreign object, and detection of the foreign object may trigger a further detection procedure involving the transmission of digital pings through the idle charging cells. FOD may also be performed while a chargeable device is receiving power through a charging cell. In one example, a driver coupled to the active charging cell, such as driver 504 in FIG. 5, may be periodically turned off for a short period of time. In another example, a slot may be provided when a controller detects a change in the operating characteristics of the active charging cell and turns off the driver coupled to the active charging cell for a short period of time to check for movement of the device being charged or presence of a foreign object. The short period of time during which the driver is turned off may be referred to a slot. Various measurements may be analyzed to detect presence of a foreign object during the driver-inactive time provided by the slot. For example, the energy in the resonant tank circuit (e.g., 506) is allowed to decay. By measuring the rate of decay, the Q factor can be determined. In turn, the Q factor determination may be used to detect a foreign object using techniques described above in connection with Table 2, for example. Additionally, other more efficient FOD methodologies may be used.

Figure 10:
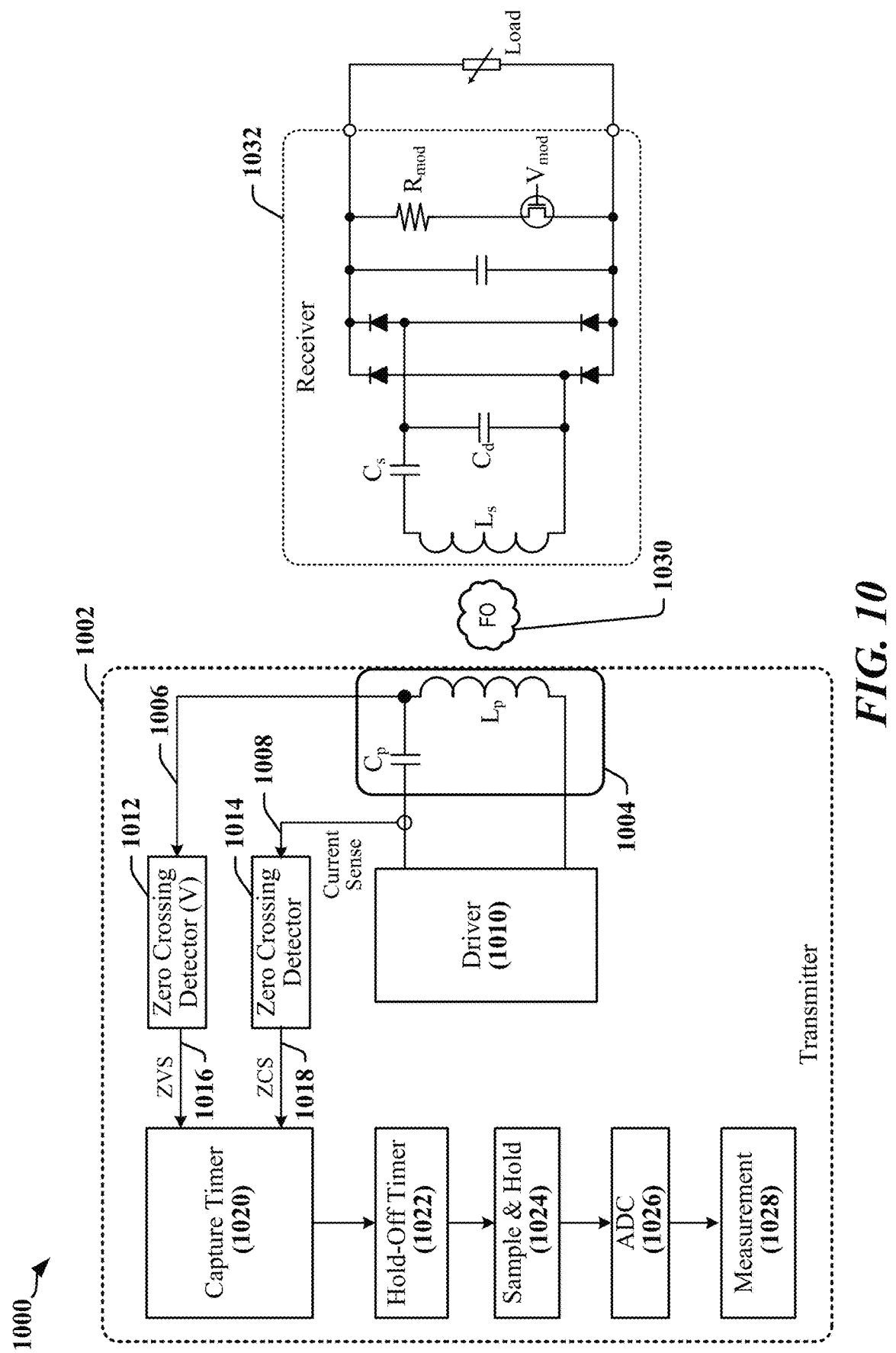
FIG. 10 illustrates a wireless charging system that employs zero-crossing detection to obtain measurements at one or more points in each cycle of current or voltage in a resonant circuit in accordance with certain aspects of the disclosure.

FIG. 10 illustrates one example of a system 1000 that may be configured to perform slotted foreign object detection to detect a foreign object (FO) on the surface of a wireless charging device 1002. A driver circuit 1010 in the wireless charging device 1002 is periodically turned off for a short period of time, which may be referred to as a slot, during which the energy in a resonant circuit 1004 driven by the driver circuit 1010 is allowed to decay. The Q factor of the resonant circuit 1004 can be determined by measuring the rate of decay. A high sample rate is typically required to accurately measure the AC waveform in the resonant circuit 1004 without aliasing or artifacts that may spoil the measurement accuracy of the Q factor. The sample rate can be a factor of ten to twenty times the frequency of the current in the resonant circuit 1004, and generally requires the use of a fast and expensive analog-to-digital converter (ADC).

In certain aspects of the disclosure, a zero-crossing detector 1012, 1014 is used to provide timing information that permits a low-cost ADC to reliably obtain an accurate measurement of the voltage at the same point in each cycle of the AC waveform in the resonant circuit 1004, during a slot provided for foreign object detection. Zero crossing slotted foreign object detection can be used to detect the zero crossing of either the voltage and/or the current in the resonant circuit 1004. The detection of the zero crossing starts a hold-off timer that triggers a sample and hold circuit in the ADC. In one example, the hold-off timer triggers the sample and hold circuit after a quarter cycle of the AC waveform in the resonant circuit 1004. In this example, the ADC reads a sample taken at the peak of the AC wave. A sample frequency that is less than the fundamental frequency of the AC waveform can be used.

Figure 11:
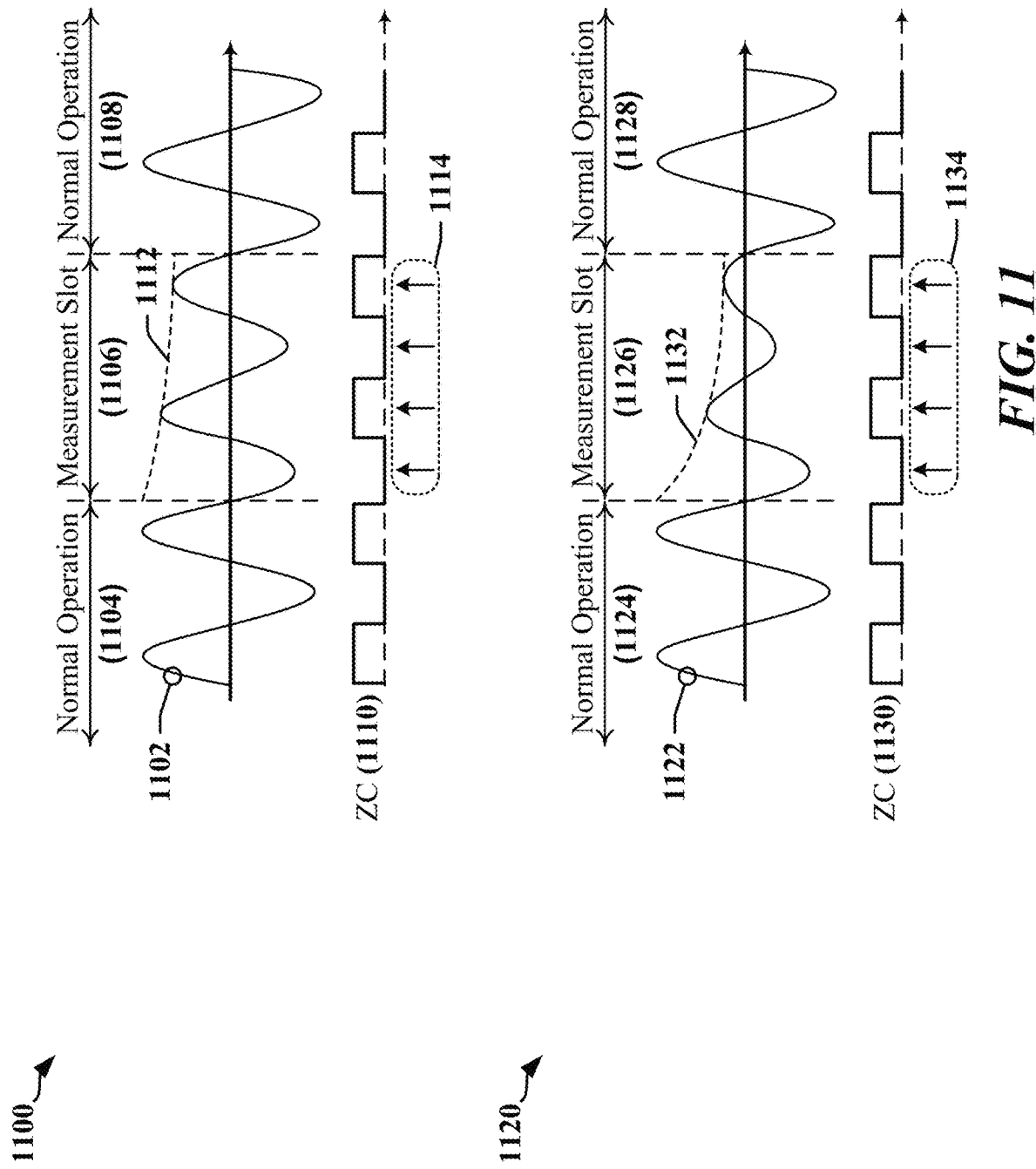
FIG. 11 illustrates zero-crossing, slotted foreign object detection in accordance with certain aspects of the disclosure.

FIG. 11 includes timing diagrams 1100, 1120 that illustrate certain aspects of a zero-crossing, slotted foreign object detection. A measurement slot 1106, 1126 is provided between periods 1104, 1108 or 1124, 1128 of normal charging operation. The first timing diagram 1100 relates to an example of a signal 1102 representing energy, voltage or current in a resonant circuit 1004 when no foreign object is present, and the slow decay 1112 in the signal 1102 corresponds to a circuit with a high Q factor. The second timing diagram 1120 relates to an example of a signal 1122 representing energy, voltage or current in the resonant circuit 1004 when a foreign object 1030 (see FIG. 10) is present between the wireless charging device 1002 and a receiver 1032 (e.g., which may include a coil (Ls) and can also be referred to simply as a power receiver (PRx)), and the decay 1132 corresponds to a circuit with a low Q factor. A zero-crossing, slotted foreign object detection technique according to certain aspects of the disclosure uses sample points 1114, 1134 identified based on detected zero crossings identified by a zero-crossing signal 1110, 1130.

Referring back to FIG. 10, this diagram illustrates an example of the wireless charging device 1002 employing zero-crossing detection to obtain measurements 1006, 1008 at one or more points in each cycle of current or voltage in a resonant circuit 1004. In one example, the measurements may be used for slotted foreign object detection in accordance with certain aspects disclosed herein. The wireless charging device 1002 includes a driver circuit 1010 that generates a charging current to drive a resonant circuit 1004 that includes an LC tank circuit including a capacitor ($C_p$) and an inductor ($L_p$). The charging current may be substantially the same as the current in the inductor. In some implementations, a voltage measurement signal 1006 representative of the voltage across the resonant circuit 1004 is provided to a first zero-crossing detector 1012. The first zero-crossing detector 1012 produces an output 1016 (ZVS) indicating the timing of zero-crossings of the voltage across the resonant circuit 1004. In some implementations, a current measurement signal 1008 representative of the current in the resonant circuit 1004 is provided to a second zero-crossing detector 1014. The second zero-crossing detector

1014 produces an output 1018 (ZCS) indicating the timing of zero-crossings of the current in the resonant circuit 1004.

A capture timing circuit 1020 may be used to track zero crossings and determine or manage the sample and hold circuit 1024. In one example, the capture timing circuit 1020 may include or use a hold-off timer 1022 that can locate the peak amplitude of the voltage or current across the resonant circuit 1004 that occurs after period of time corresponding to a half cycle of the resonant circuit 1004. In other examples, the capture timing circuit 1020 may include or use a hold-off timer 1022 that can locate one or more points of the voltage or current across the resonant circuit 1004. The sample and hold circuit 1024 provides an output digitized by the ADC 1026 to obtain a measurement 1028. The measurement 1028 may be used to track the rate of decay of the energy in the resonant circuit 1004.

Selectively Activating Coils

According to certain aspects disclosed herein, transmitting coils in one or more charging cells may be selectively activated to provide an optimal electromagnetic field for charging a compatible device. In some instances, transmitting coils may be assigned to charging cells, and some charging cells may overlap other charging cells. In the latter instances, the optimal charging configuration may be selected at the charging cell level. In other instances, charging cells may be defined based on placement of a device to be charged on a charging surface. In these other instances, the combination of coils activated for each charging event can vary. In some implementations, a charging device may include a driver circuit that can select one or more cells and/or one or more predefined charging cells for activation during a charging event.

Figure 12:
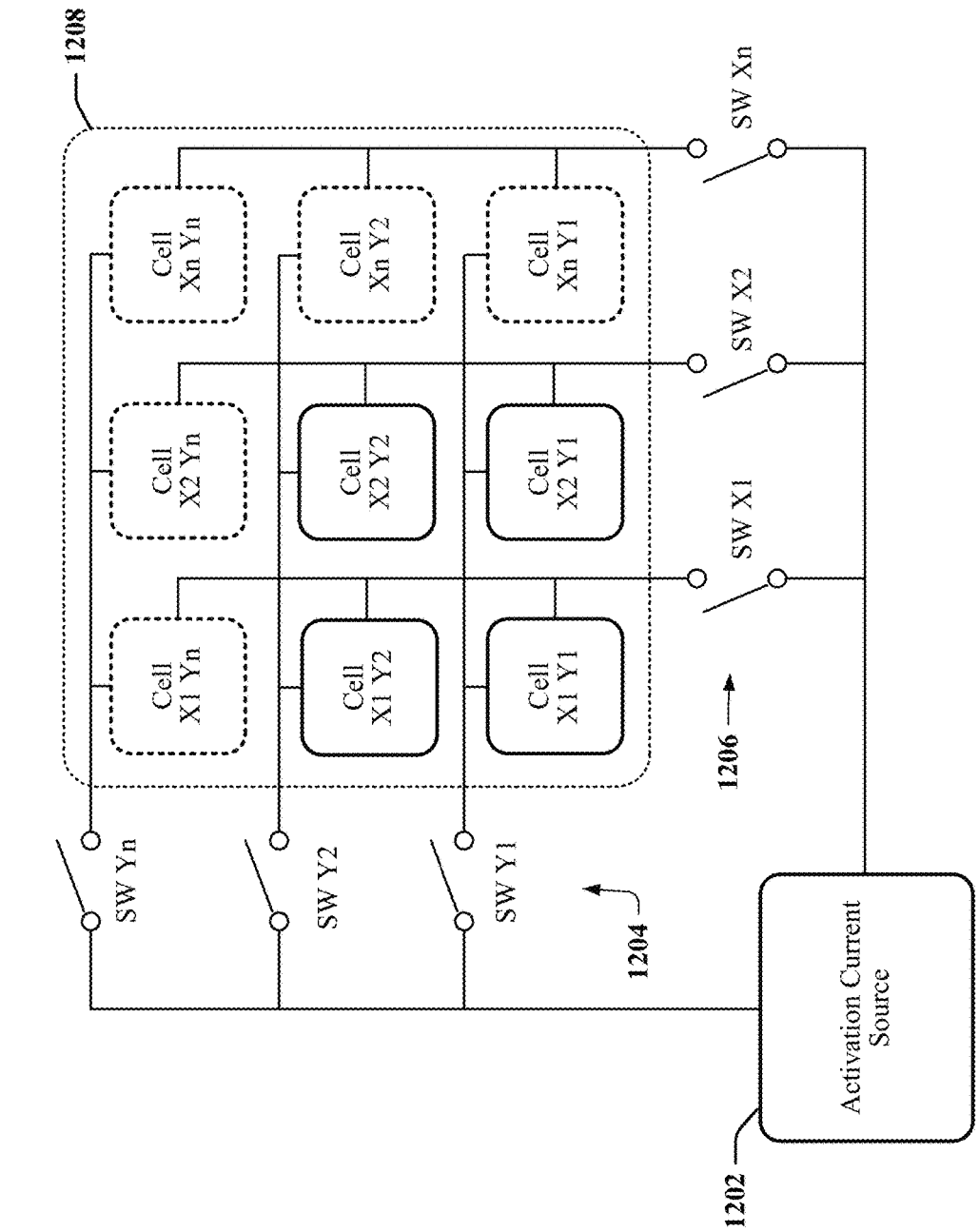
FIG. 12 illustrates a first topology that supports matrix multiplexing switching for use in a wireless charger adapted in accordance with certain aspects disclosed herein.

FIG. 12 illustrates a first topology 1200 that supports matrix multiplexing switching for use in a wireless charger adapted in accordance with certain aspects disclosed herein. The wireless charger may select one or more charging cells 100 to charge a receiving device. Charging cells 100 that are not in use can be disconnected from current flow. A relatively large number of charging cells 100 may be used in the honeycomb packaging configuration illustrated in FIG. 2 requiring a corresponding number of switches. According to certain aspects disclosed herein, the charging cells 100 may be logically arranged in a matrix 1208 having multiple cells connected to two or more switches that enable specific cells to be powered. In the illustrated topology 1200, a two-dimensional matrix 1208 is provided, where the dimensions may be represented by X and Y coordinates. Each of a first set of switches 1206 is configured to selectively couple a first terminal of each cell in a column of cells to a wireless transmitter and/or receiver circuit 1202 that provide current to activate coils during wireless charging. Each of a second set of switches 1204 is configured to selectively couple a second terminal of each cell in a row of cells to the wireless transmitter and/or receiver circuit 1202. A cell is active when both terminals of the cell are coupled to the wireless transmitter and/or receiver circuit 1202.

The use of a matrix 1208 can significantly reduce the number of switching components needed to operate a network of tuned LC circuits. For example, N individually connected cells require at least N switches, whereas a two-dimensional matrix 1208 having N cells can be operated with $\sqrt{N}$ switches. The use of a matrix 1208 can produce significant cost savings and reduce circuit and/or layout complexity. In one example, a 9-cell implementation can be implemented in a 3×3 matrix 1208 using 6 switches, saving 3 switches. In another example, a 16-cell implementation can be implemented in a 4×4 matrix 1208 using 8 switches, saving 8 switches.

During operation, at least 2 switches are closed to actively couple one coil to a wireless transmitter and/or receiver circuit 1202. Multiple switches can be closed at once in order to facilitate connection of multiple coils to the wireless transmitter and/or receiver circuit 1202. Multiple switches may be closed, for example, to enable modes of operation that drive multiple transmitting coils when transferring power to a receiving device.

Figure 13:
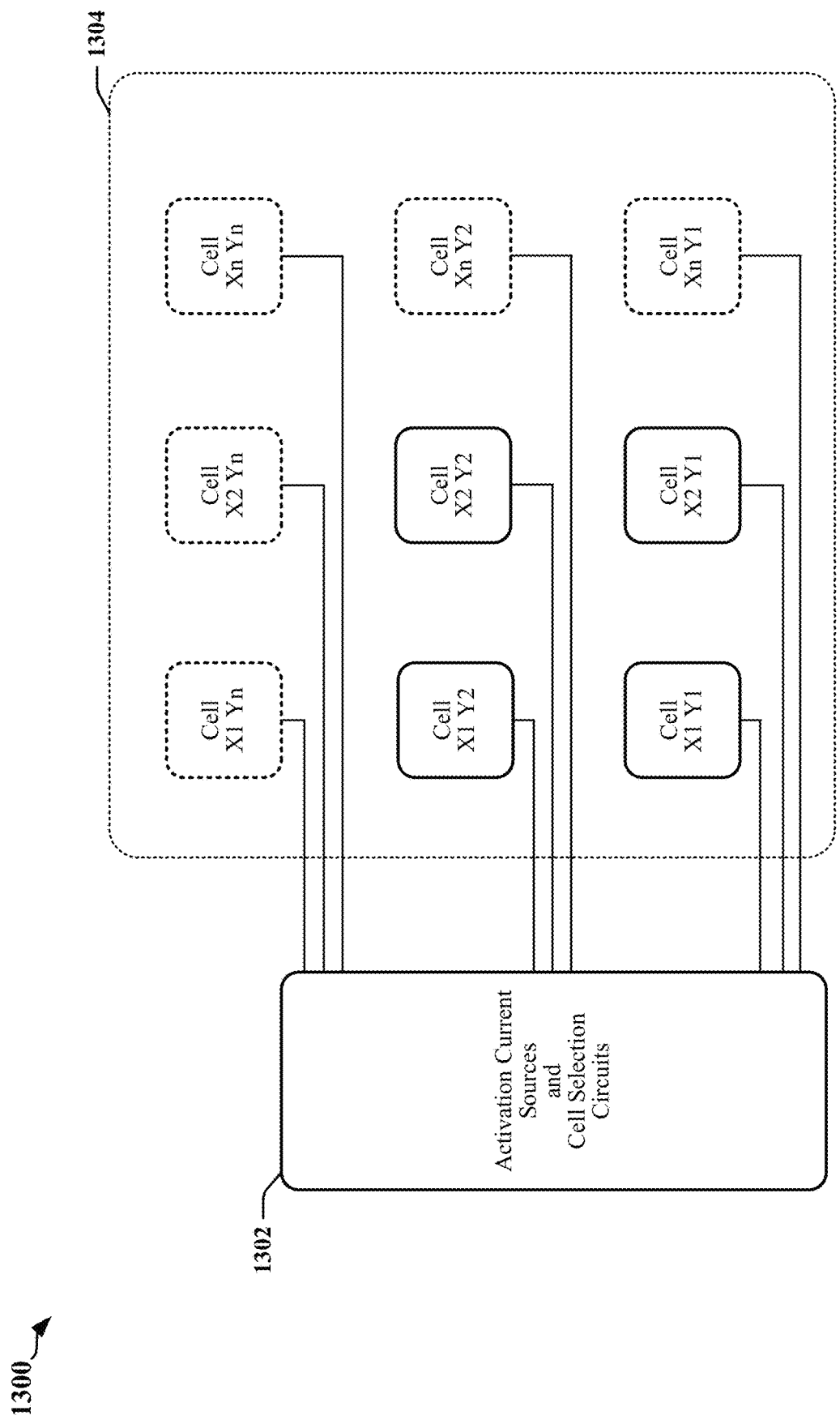
FIG. 13 illustrates a second topology that supports direct current drive in a wireless charger adapted in accordance with certain aspects disclosed herein.

FIG. 13 illustrates a second topology 1300 in which each coil or charging cell is individually and/or directly driven by a driver circuit 1302 in accordance with certain aspects disclosed herein. The driver circuit 1302 may be configured to select one or more coils or charging cells 100 from a group of coils 1304 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or a group of coils to be used during a charging event and a second switching matrix may be used to activate the charging cell and/or a group of selected coils.

Dynamic Foreign Object Detection State Avoidance

A conventional wireless charging system will enter a permanent FOD state upon detecting a foreign object, where the FOD state stops all power transfer from charging coils or cells to a power receiving device (PRx) until the foreign object is removed (or the FOD state is no longer detected).

A multi-device or multi-coil wireless charger provided in accordance with certain aspects disclosed herein can continue charging operations using unaffected charging cells. In one example, a controller may maintain a list of charging cells that are available for inclusion in a charging configuration. The controller may maintain a list of charging cells that are considered disabled or otherwise excluded from inclusion in a charging configuration. The list of disabled charging cells may include charging cells that would likely interfere with another active charging cell when activated. The list of disabled charging cells may also include charging cells through which a foreign object has been detected. In one aspect of the disclosure, the multi-device wireless charger may continue to probe the foreign object using passive ping procedures, and may thereby determine when the foreign object has been removed. In some implementations, a multi-device wireless charger may indicate the presence of the foreign object through a message or indicator displayed by the multi-device wireless charger or sent to a chargeable device located near the foreign object. In another aspect of the disclosure, the multi-device wireless charger may refrain from transmitting active pings through disabled charging cells, thereby potentially reducing power dissipation and avoiding heat induction in the foreign object. Active pings may also be referred to as digital pings.

In certain examples, the multi-device wireless charger may be able to configure a charging configuration near a foreign object using charging coils or charging cells that are not blocked by the foreign object. The charging configuration may be able to supply power to a PRx notwithstanding the presence of the foreign object. Accordingly, the present disclosure provides systems, apparatus, and methods for providing an adaptive FOD determination that can enable a multi-device wireless charger to dynamically or actively work around foreign objects, enabling the multi-device wireless charger to support, detect, monitor, or charge multiple chargeable devices as described herein.

In some instances, a foreign object may render a substantial area of the surface of a multi-device wireless charger inoperable for charging. The multi-device wireless charger may be configured to disable one or more charging zones when the foreign object obstructs all of the charging cells in the affected zones. The multi-device wireless charger may be further configured to reconfigure the charging surface to provide reconfigured charging zones. A charging zone may be associated with a driver or charging circuit that can be configured to transmit power through some combination of charging cells encompassed by the charging zone or overlapping a portion of the charging zone. In one example, a charging surface may define three zones that each encompass multiple charging cells that can be configured to receive a charging current from one of three drivers. In the event that a foreign object such as an incompatible mobile telephone is placed on the charging surface so as to block a majority or all of the charging cells in a zone, the zone may be reconfigured to include charging cells that are not blocked by the foreign object. The other two zones may be resized to accommodate the previously blocked zone. In this example, multi-device charging capability is preserved while device detection and other overheads can be reduced in each of the reduced-size zones.

The ability to mark individual charging cells or groups of charging cells inactive due to presence of a foreign object can permit a multi-device wireless charger to continue operations on at least a limited basis. In some instances, the multi-device wireless charger may be able to define a charging configuration that can permit the system to supply power to a nearby PRx using charging cells unaffected by a foreign object, thereby avoiding a permanent FOD state with respect to the nearby PRx.

Figure 14:
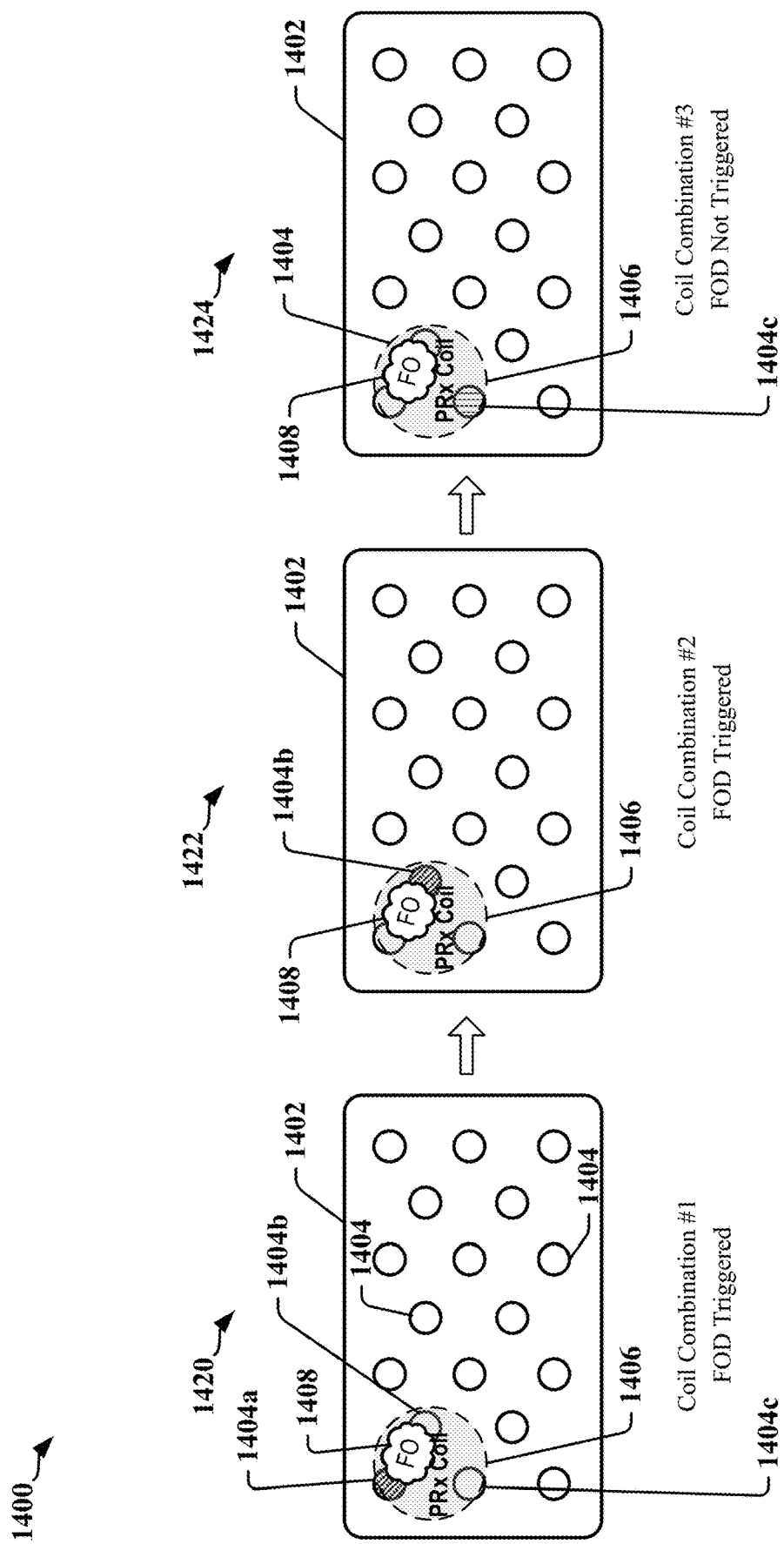
FIG. 14 illustrates various coil combinations used for adaptively avoiding a permanent foreign object detected (FOD) state according to aspects disclosed herein.

FIG. 14 illustrates an example 1400 of a multi-coil charging device 1402 in various different combination states or times (e.g., 1420, 1422, and 1424) in the same multi-coil charging device 1402 according to the presently disclosed apparatus and methods. The multi-coil charging device 1402 includes a plurality of charging coils or cells 1404 (with only some of the coils, which are drawn as circles, denoted with reference numbers for the sake of a less cluttered illustration).

In the illustrated example, a power receiving device (PRx coil) 1406 is disposed in proximity to the charging device 1402, and more specifically is located over multiple coils of the plurality of coils 1404. In this example, but the disclosure is not limited to such, three coils 1404a, 1404b, and 1404c are proximate to the PRx coil 1406 and are assumed to be able to deliver power to the PRx 1406. Additionally, it is assumed that foreign object 1408 is disposed on a surface of the charging device 1402 and may be located over coils 1404a and 1404b in this example.

In the first time scenario or state 1420, the coil 1404a is assumed as being selected to supply charging power (and shown shaded to denote that this coil 1404 is active) to the PRx 1406. Since the FO 1408 is disposed over coil 1404a, the FO 1408 will be sensed and an FOD state will be triggered. In the conventional systems, this FOD triggering leads directly to a permanent FOD state. In the present example, however, the charging controller of the charging device 1402 may switch to a next available coil as shown in time scenario 1422.

In time scenario 1422, the charger controller next selects coil 1404b to determine if this coil is blocked (in full or in part) by the FO 1408. In the illustrated example, since coil 1404b is covered by FO 1408, again an FOD state is triggered.

In a next time scenario 1424, the charger controller switches to the third available coil 1404c. In this instance, the foreign object detection procedure will not find an FO since the FO 1408 does not cover this coil 1404c. Accordingly, the charger controller will cause the coil 1404c to be active for supplying power to the PRx 1406 and a permanent FOD state is actively avoided with respect to the PRx 1406.

Figure 15:
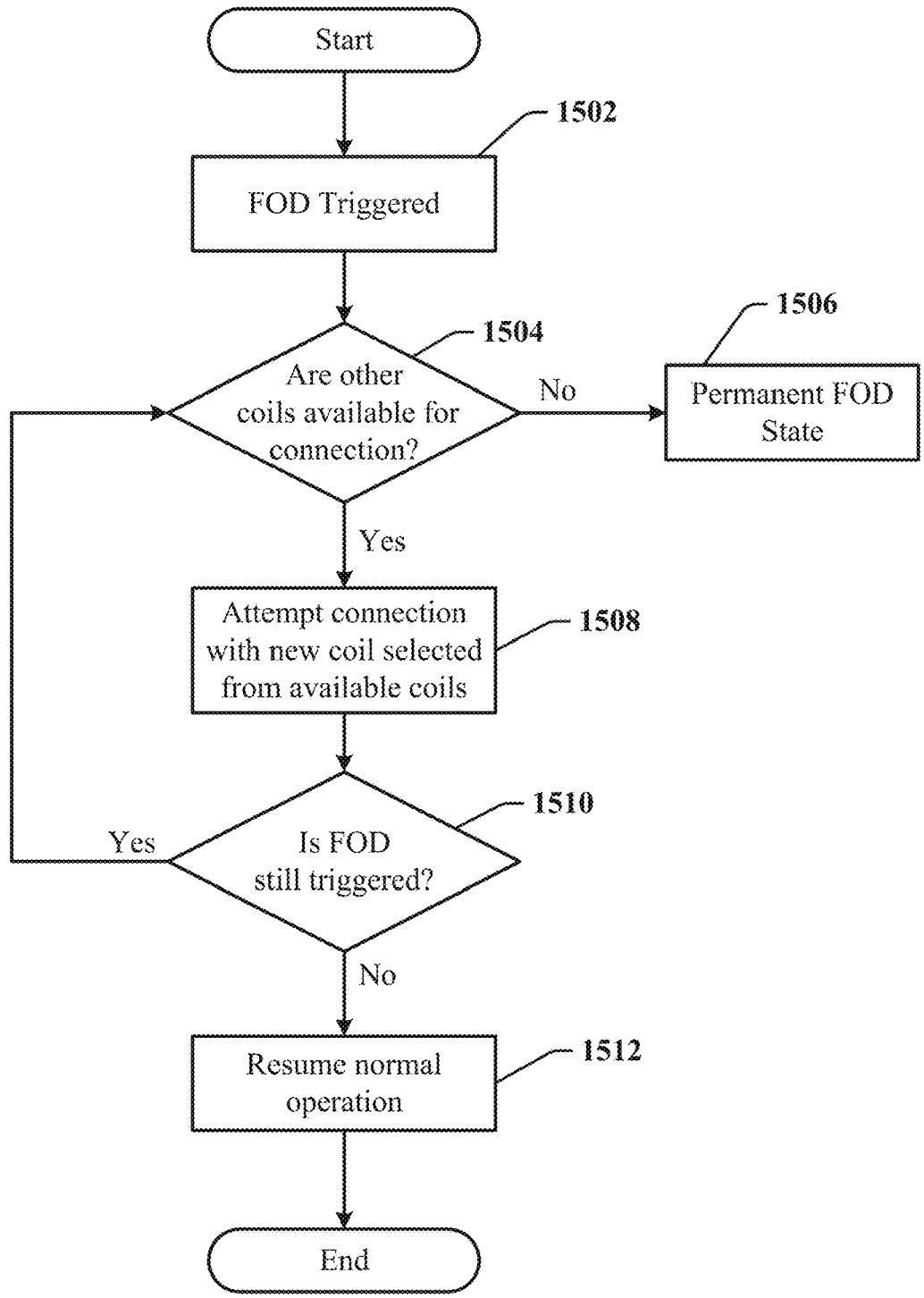
FIG. 15 illustrates a flowchart of a method for adaptively avoiding an FOD state according to aspects disclosed herein.

FIG. 15 illustrates a flowchart of a method 1500 for adaptively avoiding an FOD state in a wireless charging device or system according to aspects disclosed herein. When an FOD is triggered for at least one coil or cell as shown at block 1502, method 1500 proceeds to decision block 1504 to determine if any other coils are available for connection to a PRx. It is noted that the determination of available coils may have already been performed prior to the processes of method 1500. If not other coils are available to serve the PRx, then flow proceeds to block 1506 where a permanent FOD state is set by a controller of the charging device.

On the other hand, if other coils are available for power connection at block 1504, flow proceeds to block 1508 where an attempted connection of the selected coil is attempted with the newly selected coil from the available coils. The charger controller then checks to determine if an FOD condition is still triggered. If so, flow proceeds back to block 1504 to select a next coil from the available coils. If no further coils are available flow will proceed to block 1506 to trigger the permanent FOD state. Alternatively, if the process of blocks 1504, 1508, and 1510 yields a coil that does not trigger an FOD state for the PRx, then flow proceeds to block 1512 where a normal charging operation resumes and, thus, avoiding the permanent FOD state being initiated for the PRx.

Example of a Processing Circuit

Figure 16:
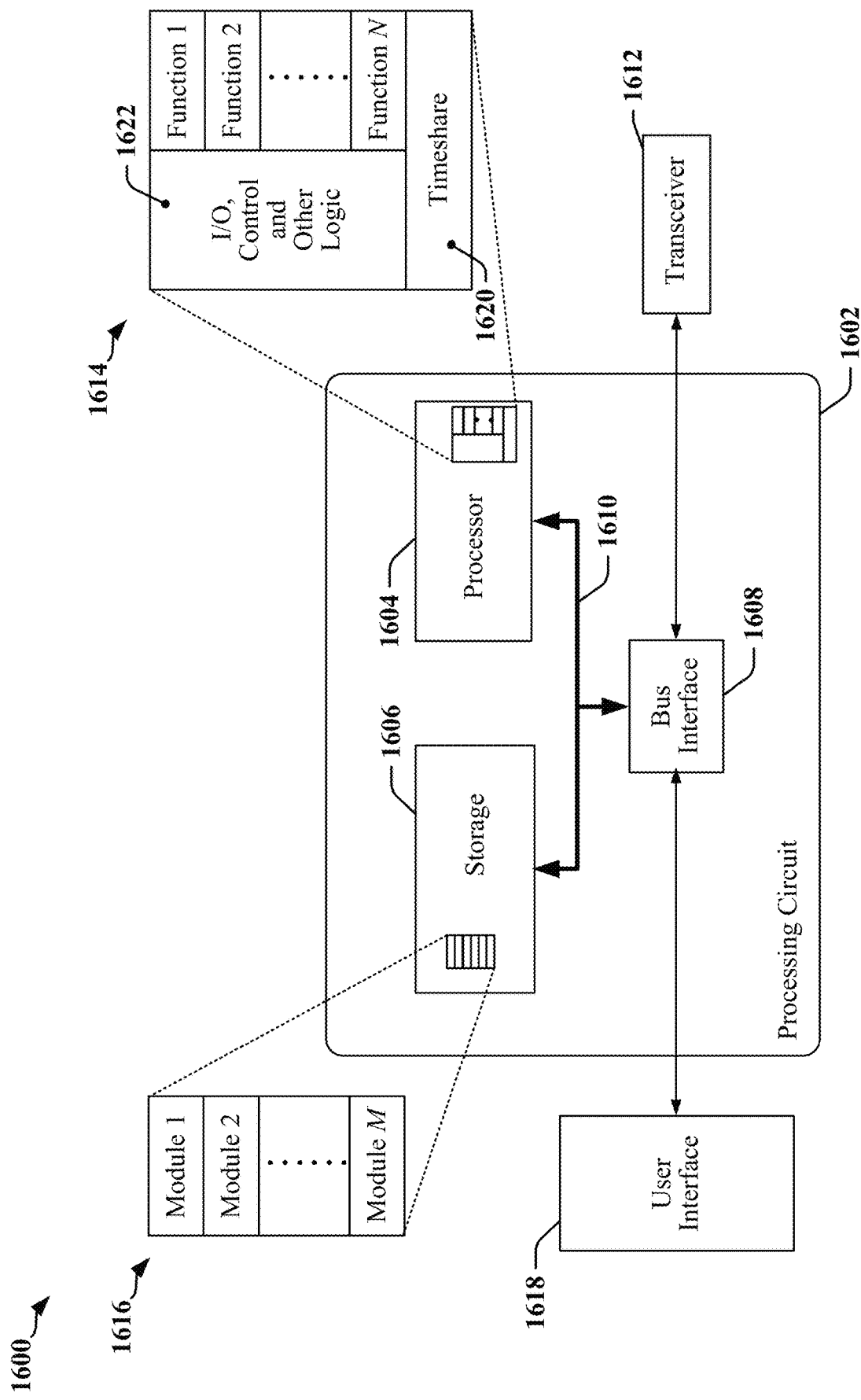
FIG. 16 illustrates one example of an apparatus employing a processing circuit that may be adapted according to certain aspects disclosed herein.

FIG. 16 illustrates an example of a hardware implementation for an apparatus 1600 that may be incorporated in a charging device that enables a battery to be wirelessly charged. In some examples, the apparatus 1600 may perform one or more functions disclosed herein. In accordance with various aspects of the disclosure, an element, or any portion of an element, or any combination of elements as disclosed herein may be implemented using a processing circuit 1602. The processing circuit 1602 may include one or more processors 1604 that are controlled by some combination of hardware and software modules. Examples of processors 1604 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable media and/or processor-readable media. The storage 1606 may include transitory storage media and/or non-transitory storage media.

The bus 1610 may also link various other circuits such as timing sources, timers, peripherals, voltage regulators, and power management circuits. A bus interface 1608 may provide an interface between the bus 1610 and one or more transceivers 1612. In one example, a transceiver 1612 may be provided to enable the apparatus 1600 to communicate with a charging or receiving device in accordance with a standards-defined protocol. Depending upon the nature of the apparatus 1600, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a computer-readable medium that may include the storage 1606. In this respect, the processing circuit 1602, including the processor 1604, may be used to implement any of the methods, functions, and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer-readable medium. The external computer-readable medium and/or storage 1606 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1606 may also include, by way of example, a carrier wave, a transmission line, and any other suitable medium for transmitting software and/or instructions that may be accessed and read by a computer. Computer-readable medium and/or the storage 1606 may reside in the processing circuit 1602, in the processor 1604, external to the processing circuit 1602, or be distributed across multiple entities including the processing circuit 1602. The computer-readable medium and/or storage 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1606 may maintain and/or organize software in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms, and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as a transceiver 1612, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to a transceiver 1612, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the transceiver 1612, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

In one implementation, the apparatus 1600 includes or operates as a wireless charging device that has a battery charging power source coupled to a charging circuit, a plurality of charging cells and a controller, which may be included in or implemented with one or more processors 1604. The plurality of charging cells may be configured to provide a charging surface. At least one coil may be configured to direct an electromagnetic field through a charge transfer area of each charging cell. The controller may be configured to cause the charging circuit to provide a charging current to a resonant circuit when a receiving device is placed on the charging surface, detect a change or rate of change in voltage or current level associated with the resonant circuit or a change or rate of change in power transferred to the receiving device, and determine that the receiving device has been removed from the charging surface when the change or rate of the change in voltage or current level or change or rate of change in power transferred to the receiving device exceeds a threshold value.

In some implementations, the resonant circuit includes a transmitting coil. The controller may be further configured to determine that the receiving device has been removed from the charging surface when a voltage measured at a terminal of the transmitting coil exceeds a threshold voltage level. In one example, the threshold voltage level is maintained by a lookup table and determined when the transmitting coil is electromagnetically uncoupled. In another example, the threshold voltage level is determined when the receiving device is first placed on the charging surface.

In certain implementations, the controller is further configured to cause a transmitting coil to issue a ping that may be received by a power receiving device (e.g., PRx) in proximity to wireless charging device (e.g., disposed on the wireless charging surface). Additionally, the transmitting coil may be configured to receive a ping reply such as an ASK modulated reply from the power receiving device (PRx). Additionally, the measured in the resonant circuit has a magnitude that is less than a threshold current level. In one example, the threshold current level is maintained by a lookup table and determined when no object is electromagnetically coupled with a coil in the resonant circuit. In another example the threshold current level is determined when the receiving device is first placed on the charging surface.

In some implementations, the apparatus 1600 has one or more sensors located proximate to an exterior surface of the charging device. The controller may be further configured to receive measurements from the one or more sensors, and measure the voltage or current level associated with the resonant circuit when one of the measurements indicates physical removal of the receiving device.

In some implementations, the storage 1606 maintains instructions and information where the instructions are configured to cause the one or more processors 1604 to. controller may detect the presence of a foreign object in proximity to at least one charging coil of a plurality of charging coils in the charging device that is selected for supplying charging energy to a receiving device. In particular, this function of detecting the FOD triggering may include the processes in block 1502 in FIG. 15, as one example, and may be detected with the apparatus and processes discussed previously in connection with FIGS. 10 and 11, as one example.

In further implementations, the storage 1606 maintains instructions and information where the instructions are configured to cause the one or more processors 1604 to determine whether one or more other charging coils of the plurality of charging coils is capable of supplying charging energy to the receiving device. In particular, this function of determining whether one or more other charging coils of the plurality of charging coils is capable of supplying charging energy to the receiving device may include the process in block 1504 in FIG. 15, as one example. Additionally, these instructions may cause the one or more processors 1604 to make determinations the capability of supplying charging energy based on passive and/or active pings as was discussed earlier.

Additionally, the storage 1606 maintains instructions and information where the instructions are configured to cause the one or more processors 1604 to determine, for each of the one or more other charging coils, whether the foreign object is in proximity to the other charging coil. In certain aspects, this function may include the process in blocks 1508 and 1510 in FIG. 15, as one example. Additionally, it is noted that the instructions may include FOD determination instructions such as those implemented in the methodology discussed in connection with FIGS. 10 and 11, for example.

Furthermore, the storage 1606 maintains instructions and information where the instructions are configured to cause the one or more processors 1604 to select at least one of the one or more other charging coils that is not in proximity to foreign object for supplying charging energy to the receiving device. In certain aspects, it is noted that this function of selection may include at least portions of the processes of blocks 1508, 1510, and 1512 in FIG. 15, in one example.

Figure 17:
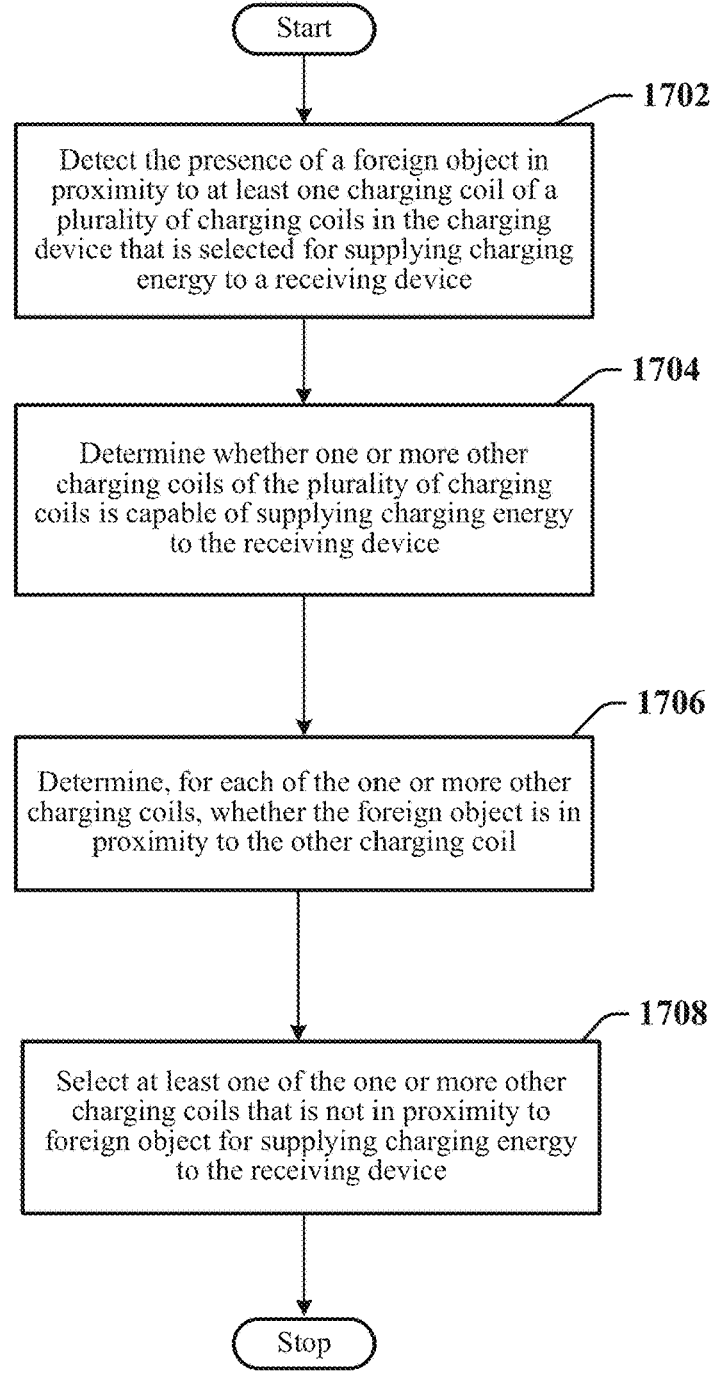
FIG. 17 illustrates a flowchart of a method for operating a charging device in accordance with certain aspects of this disclosure.

FIG. 17 is a flowchart illustrating a method 1700 for operating a charging device in accordance with certain aspects of this disclosure. The method 1700 may be performed by a controller in the charging device. At block 1702, the controller may detect the presence of a foreign object in proximity to at least one charging coil of a plurality of charging coils in the charging device that is selected for supplying charging energy to a receiving device. In certain aspects, the processes of block 1702 may include the processes of block 1502 in FIG. 15, in one example.

Additionally, the controller may determine whether one or more other charging coils of the plurality of charging coils is capable of supplying charging energy to the receiving device as illustrated in block 1704. The processes in block 1704 may include the processes of block 1504. Additionally, it is noted that the determination of whether the one or more other charging coils is capable of supplying charging energy may be based on looking up predetermined or stored coils that are capable of supplying charging energy. For example, the controller may access a lookup table in memory (e.g., storage 1606) that contains a list of coils that are capable of supplying energy to the receiving device. This predetermination may be made during an initial setup when the receiving device is placed in proximity to the charging device. In other aspects, the determination of available coils may be performed after an FOD condition is detected, such as through scanning all or a subset of coils (e.g., coils in proximity to the previously serving coil or coils within charging zone) through passive and/or active pinging of the receiving device.

Further, the controller may determine, for each of the one or more other charging coils, whether the foreign object is in proximity to the other charging coil as shown in block 1706. In certain aspects, the processes of block 1704 may include the processes of blocks 1508 and 1510 in FIG. 15, in one example.

Yet further, the controller may select at least one of the one or more other charging coils that is not in proximity to foreign object for supplying charging energy to the receiving device as shown in block 1708. In certain aspects, it is noted that the processes of block 1708 may include at least portions of the processes of blocks 1508, 1510, and 1512 in FIG. 15, in one example.

Some implementation examples are described in the following numbered clauses:

1. A method for operating a charging device, comprising: detecting the presence of a foreign object in proximity to at least one charging coil of a plurality of charging coils in the charging device that is selected for supplying charging energy to a receiving device; determining whether one or more other charging coils of the plurality of charging coils is capable of supplying charging energy to the receiving device; determining, for each of the one or more other charging coils, whether the foreign object is in proximity to the other charging coil; and selecting at least one of the one or more other charging coils that is not in proximity to foreign object for supplying charging energy to the receiving device.
2. The method as described in clause 1, further comprising: setting a permanent foreign object detection (FOD) state for the receiving device when all of the one or more other charging coils is determined to be in proximity to the foreign object.
3. The method as described in clause 2, further comprising: determining whether the foreign object is removed after setting the permanent FOD state for the receiving device; and resetting the FOD state for the receiving device after the foreign object is removed.
4. The method as described in any of clauses 1-3, wherein the determination of whether the one or more other charging coils is capable of supplying charging energy includes access a stored list of predetermined coils that are capable of supplying charging energy to the receiving device.
5. The method as described in clause 4, wherein the list of predetermined coils that are capable of supplying charging energy to the receiving device is predetermined during an initial setup when the receiving device is placed in proximity to the charging device and capable of responding to a ping from at least one of plurality of charging coils.
6. The method as described in any of clauses 1-5, wherein the determination of whether the one or more other charging coils is capable of supplying charging energy includes determination of available coils may be performed after detecting the presence of the foreign object and further includes scanning to determine whether one or more of the plurality of charging coils in the charging device is capable of supplying charging energy to the receiving device.
7. The method as described in clause 6, wherein scanning to determine whether one or more of the plurality of charging coils in the charging device is capable of supplying charging energy to the receiving device includes at least one of passive and active pinging with the charging device.
8. A charging device, comprising: a charging circuit; and a controller configured to: detect the presence of a foreign object in proximity to at least one charging coil of a plurality of charging coils in the charging device that is selected for supplying charging energy to a receiving device; determine whether one or more other charging coils of the plurality of charging coils is capable of supplying charging energy to the receiving device; determine, for each of the one or more other charging coils, whether the foreign object is in proximity to the other charging coil; and select at least one of the one or more other charging coils that is not in proximity to foreign object for supplying charging energy to the receiving device.
9. The charging device as described in clause 8, wherein the controller is configured to: set a permanent foreign object detection (FOD) state for the receiving device when all of the one or more other charging coils is determined to be in proximity to the foreign object.
10. The charging device as described in clause 9, wherein the controller is configured to: determine whether the foreign object is removed after setting the permanent FOD state for the receiving device; and reset the FOD state for the receiving device after the foreign object is removed.
11. The charging device as described in clause 8 or clause 9, wherein the controller is configured to access a stored list of predetermined coils that are capable of supplying charging energy to the receiving device when determining whether the one or more other charging coils is capable of supplying charging energy includes.
12. The charging device as described in clause 11, wherein the controller is configured to predetermine the list of predetermined coils that are capable of supplying charging energy to the receiving device during an initial setup when the receiving device is placed in proximity to the charging device and capable of responding to a ping from at least one of plurality of charging coils.
13. The charging device as described in any of clauses 8-12, wherein the determination of whether the one or more other charging coils is capable of supplying charging energy includes determination of available coils may be performed after detecting the presence of the foreign object and further includes scanning to determine whether one or more of the plurality of charging coils in the charging device is capable of supplying charging energy to the receiving device.
14. The charging device as described in clause 13, wherein scanning to determine whether one or more of the plurality of charging coils in the charging device is capable of supplying charging energy to the receiving device includes at least one of passive and active pinging with the charging device.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:
1. A method for operating a charging device, comprising: detecting the presence of a foreign object in proximity to at least one charging coil of a plurality of charging coils in the charging device that is selected for supplying charging energy to a receiving device;

determining whether one or more other charging coils of the plurality of charging coils is capable of supplying charging energy to the receiving device;

determining, for each of the one or more other charging coils, whether the foreign object is in proximity to the other charging coil; and selecting at least one of the one or more other charging coils that is not in proximity to foreign object for supplying charging energy to the receiving device.

2. The method of claim 1, further comprising:

setting a permanent foreign object detection (FOD) state for the receiving device when all of the one or more other charging coils is determined to be in proximity to the foreign object.

3. The method of claim 2, further comprising:

determining whether the foreign object is removed after setting the permanent FOD state for the receiving device; and resetting the FOD state for the receiving device after the foreign object is removed.

4. The method of claim 1, wherein the determination of whether the one or more other charging coils is capable of supplying charging energy includes access a stored list of predetermined coils that are capable of supplying charging energy to the receiving device.

5. The method of claim 4, wherein the list of predetermined coils that are capable of supplying charging energy to the receiving device is predetermined during an initial setup when the receiving device is placed in proximity to the charging device and capable of responding to a ping from at least one of plurality of charging coils.

6. The method of claim 1, wherein the determination of whether the one or more other charging coils is capable of supplying charging energy includes determination of available coils may be performed after detecting the presence of the foreign object and further includes scanning to determine whether one or more of the plurality of charging coils in the charging device is capable of supplying charging energy to the receiving device.

7. The method of claim 6, wherein scanning to determine whether one or more of the plurality of charging coils in the charging device is capable of supplying charging energy to the receiving device includes at least one of passive and active pinging with the charging device.

8. A charging device, comprising:

a charging circuit; and a controller configured to:

detect the presence of a foreign object in proximity to at least one charging coil of a plurality of charging coils in the charging device that is selected for supplying charging energy to a receiving device;

determine whether one or more other charging coils of the plurality of charging coils is capable of supplying charging energy to the receiving device;

determine, for each of the one or more other charging coils, whether the foreign object is in proximity to the other charging coil; and select at least one of the one or more other charging coils that is not in proximity to foreign object for supplying charging energy to the receiving device.

9. The charging device of claim 8, wherein the controller is configured to:

set a permanent foreign object detection (FOD) state for the receiving device when all of the one or more other charging coils is determined to be in proximity to the foreign object.

10. The charging device of claim 9, wherein the controller is configured to:

determine whether the foreign object is removed after setting the permanent FOD state for the receiving device; and reset the FOD state for the receiving device after the foreign object is removed.

11. The charging device of claim 8, wherein the controller is configured to access a stored list of predetermined coils that are capable of supplying charging energy to the receiving device when determining whether the one or more other charging coils is capable of supplying charging energy includes.

12. The charging device of claim 11, wherein the controller is configured to predetermine the list of predetermined coils that are capable of supplying charging energy to the receiving device during an initial setup when the receiving device is placed in proximity to the charging device and capable of responding to a ping from at least one of plurality of charging coils.

13. The charging device of claim 8, wherein the determination of whether the one or more other charging coils is capable of supplying charging energy includes determination of available coils may be performed after detecting the presence of the foreign object and further includes scanning to determine whether one or more of the plurality of charging coils in the charging device is capable of supplying charging energy to the receiving device.

14. The charging device of claim 13, wherein scanning to determine whether one or more of the plurality of charging coils in the charging device is capable of supplying charging energy to the receiving device includes at least one of passive and active pinging with the charging device.

* * * * *